(12) United States Patent
Bhat Noojady Krishna et al.

(10) Patent No.: US 10,771,294 B1
(45) Date of Patent: Sep. 8, 2020

(54) POWER EFFICIENT METADATA TRANSPORT SIGNALING MECHANISM FOR CODEC CONTROL AND CONFIGURATION

(71) Applicant: QUALCOMM Incorporated, San Diego, CA (US)

(72) Inventors: Raghavendra Bhat Noojady Krishna, San Diego, CA (US); Siddartha Shaik, Hyderabad (IN); Mallikarjuna G B, Hyderabad (IN); Alexy Joseph, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/403,198

(22) Filed: May 3, 2019

(51) Int. Cl.
*H04L 25/49* (2006.01)
*H04B 7/26* (2006.01)

(52) U.S. Cl.
CPC .............. *H04L 25/49* (2013.01); *H04B 7/26* (2013.01)

(58) Field of Classification Search
CPC ... H04L 41/0896; H04L 47/824; H04L 25/49; H04L 25/03343; H04L 27/2601; H04B 7/26
See application file for complete search history.

(56) References Cited

U.S. PATENT DOCUMENTS

| | | | | |
|---|---|---|---|---|
| 8,086,213 | B1* | 12/2011 | Wong | H04W 52/0206 455/343.1 |
| 9,141,577 | B2* | 9/2015 | Wagh | G06F 13/385 |
| 2009/0279889 | A1* | 11/2009 | Kirkpatrick | H04B 10/25752 398/41 |
| 2014/0006670 | A1* | 1/2014 | Wagh | G06F 13/4027 710/305 |
| 2014/0114887 | A1* | 4/2014 | Iyer | G06F 13/4004 706/12 |
| 2017/0031863 | A1* | 2/2017 | Glaser | G06F 13/4291 |
| 2020/0044769 | A1* | 2/2020 | Neelisetty | H04W 4/80 |

* cited by examiner

*Primary Examiner* — Khanh C Tran
(74) *Attorney, Agent, or Firm* — Holland & Hart LLP/Qualcomm

(57) ABSTRACT

A compressed over pulse-code modulation (PCM) (CoP) format (e.g., for data transfer between a Bluetooth component and an audio digital signal processor (ADSP) component) may be modified to transport additional metadata (e.g., sideband data). Sideband data may be transported to convey parameter control information (e.g., control information for codec parameter control interfaces, such as information for quality mode changes), in band data (e.g., data specific parameters, such as timestamps for playback timing control and synchronization purposes), etc. Sideband data may be transported (e.g., communicated) over an interface between a Bluetooth component and an ADSP component while an applications processor is operating in a low power state or sleep mode. According to some aspects, the modified CoP format (e.g., a sideband packet) may include a sideband identification (ID) field and a sideband data payload (e.g., where the sideband ID field indicates the structure of a corresponding sideband data payload).

19 Claims, 16 Drawing Sheets

| Header | Num frames | Len | Data packet | Zero_stuff_Len | Zero-stuffing |

FIG. 4A
400

| Header | Num side-bands | Side-band hdr1 | Side-band hdr2 | Side band payload | Side-band hdr1 | Side-band hdr2 | Side band payload | Num frames | Len | Data packet | Zero_stuff_Len | Zero-stuffing |

FIG. 4B
401

| Header | Num side-band = 1 | Side-band hdr1 | Side-band hdr2 | Media Payload Header SB | Num frames=0 | Len=0 | Zero_stuff_Len | Zero-stuffing |

FIG. 4C
402

| Header | Num side-band = 1 | Side-band hdr1 | Side-band hdr2 | Media Payload Header SB | Num frames=0 | Len=0 | Zero_stuff_Len=0 |

FIG. 4D
403

SIDE_BAND_INFO_MEDIA_HEADER_ID

SIDE_BAND_INFO_MEDIA_HEADER_CP_ID

SIDE_BAND_INFO_MEDIA_HEADER_NUMFRAMES_ID

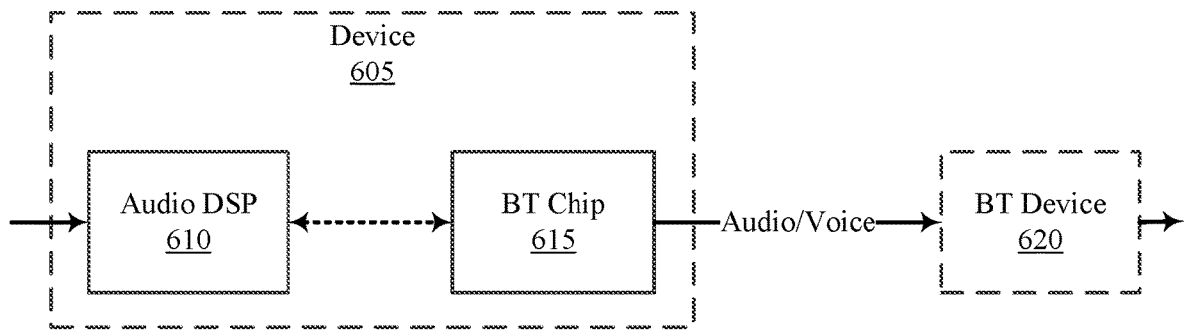
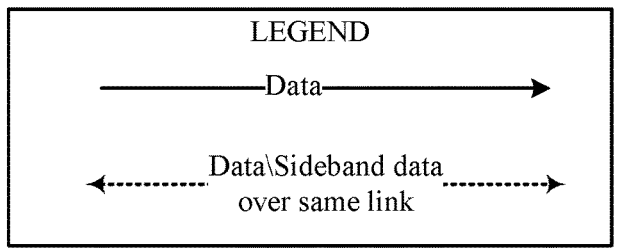
FIG. 6

US 10,771,294 B1

POWER EFFICIENT METADATA TRANSPORT SIGNALING MECHANISM FOR CODEC CONTROL AND CONFIGURATION

BACKGROUND

The following relates generally to communications, and more specifically to power efficient metadata transport signaling mechanisms for codec control and configuration.

Wireless communications systems are widely deployed to provide various types of communication content such as voice, video, packet data, messaging, broadcast, and so on. Wireless Personal Area Network (PAN) communications such as Bluetooth communications may allow for short range wireless connections between two or more paired wireless devices (e.g., that have established a wireless communication channel or link).

For example, mobile devices such as cellular phones may utilize wireless PAN communications to exchange data such as audio signals with wireless headsets. In some cases, Bluetooth communications may require enhanced quality of service. For example, successful bidirectional transmission of audio information for voice may have a relatively low tolerance for packet loss or timing issues. As such, the link quality between two devices may affect the data rate used for communications (e.g., as poor link quality may be associated with reduced bitrates for more robust communications).

SUMMARY

The described techniques relate to improved methods, systems, devices, or apparatuses that support power efficient metadata transport signaling mechanisms for codec and/or framework control and configuration. Generally, the described techniques provide for a signaling mechanism to support encoder, decoder, and\or framework configuration (e.g., encoder mode, audio bitrate, etc.) determination and modification related to a Bluetooth component (e.g., a Bluetooth chip) and a digital signal processor (DSP) component of a device.

In some cases, data transfer between a Bluetooth component and a DSP component (e.g., an audio DSP (ADSP)) may be supported over an interface (e.g., a serial low-power inter-chip media bus (SLIMbus)) using, for example, a compressed over pulse-code modulation (PCM) (CoP) format. A CoP format may be modified to transport additional metadata (e.g., sideband data). The modified format may be used to support sideband data transfer in both directions (e.g., from an ADSP to a Bluetooth component and from a Bluetooth component to an ADSP). As used herein, the term "sideband data" refers to control information that is separate from audio, video, or other media data exchanged between the Bluetooth component and the DSP component. For example, in some cases, the sideband data may be transported to convey parameter control information (e.g., control information for codec parameter control interfaces, such as information for quality mode changes), in band data (e.g., additional information indicating data specific parameters, such as timestamps for playback timing control and audio-to-video synchronization (AVSync) purposes), etc.

Sideband data (e.g., a modified CoP format including sideband data) may be transported (e.g., communicated) over an interface between a Bluetooth component and a DSP component while an applications processor (or other processor in communication with the DSP) is operating in a low power state or sleep mode. In some examples, sideband data may include an encoding parameter (e.g., identified by a Bluetooth component based on an encoding mode condition, link conditions, etc.), and may be conveyed to the DSP component such that an encoding or decoding process may be modified based on the sideband data (e.g., based on the encoding parameter). Additionally or alternatively, sideband data may include metadata (e.g., such as timestamp information) associated with a data payload (e.g., metadata associated with CoP data transfer over the interface between the Bluetooth component and the DSP component for a decoder module running on the DSP component). Such sideband data may be conveyed to the DSP component such that the DSP component may control a delivery time for optimizing a round trip latency, control a rate of data packet consumption, control a rate of data packet production, control a quality mask of encoded data packets, etc. (e.g., based on the sideband data).

According to some aspects, the modified CoP format (e.g., a sideband packet) may include a sideband identification (ID) field and a sideband data payload (e.g., where the type, format, contents, etc. of the sideband data payload may be indicated by the sideband ID field). For example, a sideband ID field may indicate a structure of a sideband packet (e.g., of a sideband payload field), and may indicate whether the sideband payload field includes an encoding parameter, a sequence number, a timestamp, content protection information, a number of frames, delivery time information, a drift, a frame size, a quality mask, reserved information bits, or some combination thereof. In some cases, the CoP format may be modified to include multiple sideband payload fields (e.g., identified or indicated by multiple sideband ID fields).

A method of communications at a wireless device is described. The method may include transporting a first portion of a set of encoded data packets over an interface between a Bluetooth component of the wireless device and a digital signal processor of the wireless device, transporting over the interface a sideband packet including an encoding parameter for the set of encoded data packets, modifying an encoding or decoding process associated with the set of encoded data packets based on the sideband packet, and transporting a second portion of the set of encoded data packets over the interface, where the second portion of the set of encoded data packets is encoded according to the modified encoding or decoding process.

An apparatus for communications at a wireless device is described. The apparatus may include a processor, memory in electronic communication with the processor, and instructions stored in the memory. The instructions may be executable by the processor to cause the apparatus to transport a first portion of a set of encoded data packets over an interface between a Bluetooth component of the wireless device and a digital signal processor of the wireless device, transport over the interface a sideband packet including an encoding parameter for the set of encoded data packets, modify an encoding or decoding process associated with the set of encoded data packets based on the sideband packet, and transport a second portion of the set of encoded data packets over the interface, where the second portion of the set of encoded data packets is encoded according to the modified encoding or decoding process.

Another apparatus for communications at a wireless device is described. The apparatus may include means for transporting a first portion of a set of encoded data packets over an interface between a Bluetooth component of the wireless device and a digital signal processor of the wireless device, transporting over the interface a sideband packet including an encoding parameter for the set of encoded data packets, modifying an encoding or decoding process associated with the set of encoded data packets based on the sideband packet, and transporting a second portion of the set of encoded data packets over the interface, where the second portion of the set of encoded data packets is encoded according to the modified encoding or decoding process.

A non-transitory computer-readable medium storing code for communications at a wireless device is described. The code may include instructions executable by a processor to transport a first portion of a set of encoded data packets over an interface between a Bluetooth component of the wireless device and a digital signal processor of the wireless device, transport over the interface a sideband packet including an encoding parameter for the set of encoded data packets, modify an encoding or decoding process associated with the set of encoded data packets based on the sideband packet, and transport a second portion of the set of encoded data packets over the interface, where the second portion of the set of encoded data packets is encoded according to the modified encoding or decoding process.

Some examples of the method, apparatuses, and non-transitory computer-readable medium described herein may further include operations, features, means, or instructions for transporting a data payload over the interface, where the sideband packet further includes metadata associated with the data payload. Some examples of the method, apparatuses, and non-transitory computer-readable medium described herein may further include operations, features, means, or instructions for identifying an encoding mode condition, and identifying an encoding mode for the second portion of the set of encoded data packets based on the identified encoding mode condition, where the encoding parameter may be based on the identified encoding mode. Some examples of the method, apparatuses, and non-transitory computer-readable medium described herein may further include operations, features, means, or instructions for identifying a link condition, and identifying a bitrate for the second portion of the set of encoded data packets based on the identified link condition, where the encoding parameter may be based on the identified bitrate.

Some examples of the method, apparatuses, and non-transitory computer-readable medium described herein may further include operations, features, means, or instructions for identifying a sideband identification field of the sideband packet, where a data payload of the sideband packet may be based on the identified sideband identification field. In some examples of the method, apparatuses, and non-transitory computer-readable medium described herein, the sideband identification field indicates a structure of a sideband payload field, a format of the sideband packet, or both. In some examples of the method, apparatuses, and non-transitory computer-readable medium described herein, the data payload includes a sequence number, a timestamp, content protection information, a number of frames, delivery time information, a drift, a frame size, a quality mask, reserved information bits, or some combination thereof.

Some examples of the method, apparatuses, and non-transitory computer-readable medium described herein may further include operations, features, means, or instructions for controlling a delivery time for optimizing a round trip latency, a rate of data packet consumption, a rate of data packet production, a quality mask of encoded data packets, or some combination thereof, based on the sideband packet. In some examples of the method, apparatuses, and non-transitory computer-readable medium described herein, the sideband packet includes framework control information.

In some examples of the method, apparatuses, and non-transitory computer-readable medium described herein, the sideband packet includes multiple sideband payload fields. In some examples of the method, apparatuses, and non-transitory computer-readable medium described herein, the sideband packet may be transported over the interface based on a compressed over pulse-code modulation format. In some examples of the method, apparatuses, and non-transitory computer-readable medium described herein, the sideband packet may be transported over the interface from the Bluetooth component of the wireless device to the digital signal processor of the wireless device. In some examples of the method, apparatuses, and non-transitory computer-readable medium described herein, the sideband packet may be transported over the interface from the digital signal processor of the wireless device to the Bluetooth component of the wireless device.

In some examples of the method, apparatuses, and non-transitory computer-readable medium described herein, modifying the decoding process may include operations, features, means, or instructions for identifying, at a decoder module of the digital signal processor, a timestamp associated with a first encoded data packet of the first portion of the set of encoded data packets based on the encoding parameter, where the decoding process may be modified based on the identified timestamp.

BRIEF DESCRIPTION OF THE DRAWINGS

FIGS. 4A, 4B, 4C, and 4D illustrate example packet formats that support power efficient metadata transport signaling mechanisms for codec control and configuration in accordance with aspects of the present disclosure.

FIG. 6 illustrates an example of a system that supports power efficient metadata transport signaling mechanisms for codec control and configuration in accordance with aspects of the present disclosure.

DETAILED DESCRIPTION

Figure 1:
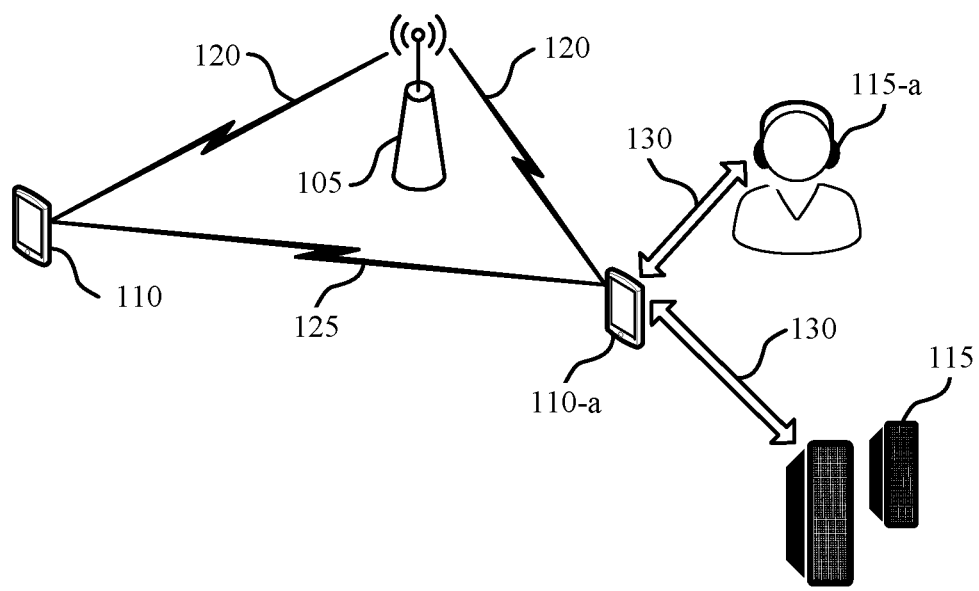
FIG. 1 illustrates an example of a system for communications that supports power efficient metadata transport signaling mechanisms for codec control and configuration in accordance with aspects of the present disclosure.

Bluetooth communications (e.g., such as bidirectional transmission of audio information for voice) may have a relatively low tolerance for packet loss or timing issues. Further, to support high quality Bluetooth communications, it may be desirable to employ high bitrates for Bluetooth transmissions (e.g., high quality Bluetooth audio may demand high bitrates for quality user experience). Link conditions between two paired Bluetooth devices may have an impact on the data throughput (e.g., the audio bitrates) achievable while maintaining such a relatively low tolerance for packet loss. For example, poor link conditions, affected by noise, distance, interference, etc., may be associated with increased occurrence of information loss during wireless communications. In cases where link conditions are poor, wireless communications may employ reduced bitrates (e.g., which may be associated with reduced data throughput), as reduced bitrates may introduce redundant information bits, such that the information may be conveyed more robustly. For example, reduced bitrates that introduce redundancy into data transmissions may be more robust to some information loss due to poor link quality. In cases where link conditions are strong, higher bitrates may be used as the channel or link is less likely to be associated with loss of information. Further, different encoder modes (e.g., codecs) may or may not be suitable for different applications (e.g., gaming, voice, high quality stereo audio, etc.).

As such, it may be desirable to control certain parameters on the fly for optimal usage of varying link quality conditions and to provide configuration control for encoders and decoders running on audio digital signal processors (ADSPs). For example, different encoder modes (e.g., codec configurations) may be employed for different applications (e.g., such as gaming, voice, etc.). Further, it may be desirable to adapt encoding schemes (e.g., audio bitrates) to varying link conditions (e.g., varying signal and noise conditions) to employ the highest audio bitrates feasible given the link quality. However, such ADSP control (e.g., configuring codecs, transitioning between usage of different audio bitrates, etc.) may result in increased power consumption. For example, in some cases, additional device components (e.g., such as an applications processor) may be powered for configuration of an ADSP. For Bluetooth applications associated with more frequent ADSP configuration (e.g., due to dynamic changes in Bluetooth link capacity, etc.), frequent powering of an applications processor for such configurations may be costly in terms of power consumption. Further, in cases where an applications processor is involved in ADSP configuration, additional signaling protocols may be required for synchronization of audio data and associated metadata (e.g., when an applications processor sends or relays parameter control information and in band data for audio codec control/configuration procedures).

The described techniques may provide for power efficient ADSP configuration (e.g., encoder mode or codec configuration, as well as dynamic control of codecs, such as bitrate control). A compressed over pulse-code modulation (PCM) (CoP) format (e.g., for data transfer between a Bluetooth component and an ADSP component) may be modified to transport additional metadata (e.g., sideband data). Sideband data may be transported to convey parameter control information (e.g., control information for codec parameter control interfaces, such as information for quality mode changes), in band data (e.g., data specific parameters, such as timestamps for playback timing control and synchronization purposes), etc. The sideband data may be transported (e.g., communicated) over an interface between a Bluetooth component and a DSP component and may provide for control data interface. Accordingly, other hardware of the device, which may be costlier to operate in terms of power consumption, may remain in a low power or sleep state (e.g., an applications processor may remain operating in a low power state or sleep mode). According to some aspects, the modified CoP format (e.g., a sideband packet) may include a sideband identification (ID) field and a sideband data payload (e.g., where the sideband ID field indicates the structure of a corresponding sideband data payload).

The described signaling between a Bluetooth component and a DSP component of a device may result in reduced power consumption, as the direct signaling may alleviate the need to power other hardware components of the device (e.g., such as an applications processor of the device). That is, according to some examples, ADSP configuration and control information signaling may be performed independently by the Bluetooth component and the ADSP component, such that other hardware need not process or pass along information for (e.g., and thus need not consume power for) encoding scheme adaptations. Further, in some cases, signaling between the Bluetooth component and the DSP component may provide for quicker encoding modifications, as the Bluetooth component may transmit encoding parameters, timestamp information, etc. directly to audio encoding/decoding/framework blocks.

Aspects of the disclosure are initially described in the context of a wireless communications system. Example packet formats, example sideband data payloads, example device diagrams, and process flow examples for implementation of the discussed techniques are then described. Aspects of the disclosure are further illustrated by and described with reference to apparatus diagrams, system diagrams, and flowcharts that relate to power efficient metadata transport signaling mechanisms for codec control and configuration FIG. 1 illustrates a wireless communications system 100 (e.g., which may include to refer to a wireless personal area network (PAN), a wireless local area network (WLAN), a Wi-Fi network) configured in accordance with various aspects of the present disclosure. In the present example, devices in wireless communications system 100 may support Bluetooth communications with one or more paired devices 115. For example, devices 110 may include cell phones, mobile stations, personal digital assistant (PDAs), other handheld devices, netbooks, notebook computers, tablet computers, laptops, or some other suitable terminology. Paired devices 115 may include Bluetooth devices capable of pairing with other Bluetooth devices (e.g., such as devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth allows for the creation of a wireless PAN between a master device and one or more slaves devices. In some cases, a device 110 may general refer to a master device, and a paired device 115 may refer to a slave device in a PAN. As such, in some cases, a device may be referred to as either a device 110 or a paired device 115 based on the configuration of the Bluetooth configuration between the device and a second device. That is, designation of a device as either a device 110 or a paired device 115 may not necessarily indicate a distinction in device capability, but rather may refer to or indicate roles held by the device in the PAN. Generally, device 110 may refer to a wireless communication device capable of wirelessly exchanging data signals with another device, and paired device 115 may refer to a device operating in a slave role, or to a short-range wireless device capable of exchanging data signals with the mobile device (e.g., using Bluetooth communication protocols).

Bluetooth systems (e.g., aspects of wireless communications system 100) may be organized using a master-slave relationship employing a time division duplex protocol having, for example, defined time slots of 625 mu secs, in which transmission alternates between the master (e.g., device 110) and slave (e.g., paired device 115). In some cases, certain types of Bluetooth communications (e.g., such as high quality or high definition (HD) Bluetooth) may require enhanced quality of service.

For example, in some cases, Bluetooth traffic may have higher priority than WLAN traffic and may be delay-sensitive. In some cases, Bluetooth device may be compatible with certain Bluetooth profiles to use desired services. A Bluetooth profile may refer to a specification regarding an aspect of Bluetooth-based wireless communications between devices. For example, a Bluetooth connection may be an extended synchronous connection orientated (eSCO) link for voice call (e.g., which may allow for retransmission), an asynchronous connection-less (ACL) link for music streaming (e.g., A2DP), etc.

For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., paired device 115-a) are acknowledged, and may be retransmitted if not acknowledged during a retransmission window. In addition, audio may be streamed between the device 110-a and paired device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some examples, the described techniques may be employed by devices capable of both Bluetooth and WLAN communications. In such cases, wireless communications system 100 may include an AP 105 and multiple associated devices 110. In some cases, the AP 105 and the associated devices 110 may represent a basic service set (BSS) or an extended service set (ESS), where the various devices 110 in the network are able to communicate with one another through the AP 105. In some examples, content, media, audio, etc. exchanged between a device 110 and a paired device 115 may originate from a WLAN. For example, in some cases, device 110-a may receive audio from an AP 105 (e.g., via WLAN communications), and the device 110-a may then implement the described techniques to relay or pass the audio to the paired device 115-a (e.g., via Bluetooth communications).

With wireless Bluetooth devices, such as headphones, becoming more predominant, improved high fidelity audio playback on Bluetooth headphones (e.g., such as paired devices 115) becomes of higher demand. To support high quality Bluetooth communications, it may be desirable to employ high bitrates for Bluetooth transmissions (e.g., high quality Bluetooth audio may demand high bitrates). Link conditions between two paired Bluetooth devices (e.g., between device 110-a and paired device 115-a) may have an impact on the data throughput (e.g., the audio bitrates) achievable while maintaining low tolerance for packet loss.

For example, poor link conditions, affected by noise, distance, interference, etc., may be associated with increased occurrence of information loss during wireless communications. In cases where link conditions are poor, wireless communications may employ reduced bitrates (e.g., which may be associated with reduced data throughput), as reduced bitrates may introduce redundant information bits, such that the information may be conveyed more robustly. For example, reduced bitrates that introduce redundancy into data transmissions may be more robust to some information loss due to poor link quality. In cases where link conditions are strong, higher bitrates may be used as the channel or link is less likely to be associated with loss of information.

In some examples, the throughput associated with a Bluetooth link may vary (e.g., from as high as 1 Mbps to as low as 150 Kbps) depending on one or more factors (e.g., link quality, audio bitrate). With such variation in throughput, determining updated or adjusted bitrates may pose challenges due to the power consumption associated with encoding scheme modifications. Further, it may be desirable for the system to react to link conditions as quickly as possible to reduce the probability of glitches or other inefficiencies. The described techniques provide for power efficient methods of control data interfacing which may be provided to encoder and decoder modules to accomplish both codec configuration requirements as well as dynamic control of codecs.

While maintaining high quality over Bluetooth link, it is also important to be able to control certain parameters on the fly for optimal usage of varying link quality conditions and to provide configuration control for encoders and decoders running on ADSPs. Information for audio codec control may include parameter control information (e.g., codecs have generic parameter control interfaces apart from data interface, which may also be used to send control information such as quality mode change), in band data (e.g., some codecs may utilize additional information indicating data specific parameters, such as timestamps for playback timing control and AVSync purposes), etc. In some applications (e.g., non-Bluetooth music playback or capture applications), such additional requirements may be handled by an applications processor. However, Bluetooth applications may be associated with more frequent configurations due to reasons such as dynamic changes in Bluetooth link capacity, which may be power consuming if the applications processor is woken up so frequently. Another disadvantage with applications processor sending the data is that synchronization of audio data and associated metadata may utilize additional signaling protocols. To circumvent such problems, the data path mechanism between BT firmware and ADSP is enhanced to introduce additional capability of transmitting metadata, named as sideband data.

A CoP format (e.g., for data transfer between a Bluetooth component and an ADSP component) may be modified to transport additional metadata (e.g., sideband data). Sideband data may be transported to convey parameter control information (e.g., control information for codec parameter control interfaces, such as information for quality mode changes), in band data (e.g., data specific parameters, such as timestamps for playback timing control and synchronization purposes), etc. Sideband data may be transported (e.g., communicated) over an interface between a Bluetooth component and a DSP component while an applications processor is operating in a low power state or sleep mode. According to some aspects, the modified CoP format (e.g., a sideband packet) may include a sideband ID field and a sideband data payload (e.g., where the sideband ID field indicates the structure of a corresponding sideband data payload).

In some examples, device 110-a and/or paired device 115-a may employ signaling and feedback mechanisms such that the Bluetooth firmware (e.g., associated with a Bluetooth component) may evaluate link quality and feedback encoding parameters to an ADSP (e.g., a DSP component), such that the encoding scheme may be adjusted or modified by the ADSP dynamically. Encoding scheme modifications may include or refer to audio bitrate modifications, codec modifications, etc., and may be determined by the Bluetooth component, DSP component, or both. In some examples, device 110-a and/or paired device 115-a may employ signaling and feedback mechanisms such that the Bluetooth firmware (e.g., associated with a Bluetooth component) may convey in band data (e.g., such as information indicating data specific parameters, such as timestamps for playback timing control and AVSync purposes) to an ADSP (e.g., a DSP component), such that the encoding scheme may be adjusted or modified by the ADSP dynamically. Such signaling mechanisms may provide for direct signaling between the Bluetooth firmware and the DSP component, and may thus be implemented without further involvement (e.g., from a host device). As such, delays in getting feedback information to the ADSP may be reduced (e.g., as metadata information may not be routed through other hardware), unnecessary wakeup of the application processor may be reduced (e.g., which may result in power consumption savings), etc.

In some cases, sideband data signaled from the Bluetooth component of device 110-a to the DSP component of device 110-a may include parameters indicative of an encoding or decoding process (e.g., parameters indicative of a codec configuration, a bitrate, etc.), parameter indicative of a link condition (e.g., such as a throughput parameter, a Bluetooth connect (BTC) condition, a flow stop parameter, a static multi-link condition), etc. In such cases, the DSP component of device 110-a may modify an encoding or decoding process, determine an adjusted audio bitrate, modify the adjusted audio bitrate indicated by the Bluetooth component of device 110-a, etc., based on received sideband information.

According to some aspects, the sideband data may be sent from the Bluetooth component of device 110-a to the DSP component of device 110-a while an applications processor of device 110-a (or other processor in communication with the DSP) is operating in a low power or sleep mode. The DSP component of device 110-a may then modify an encoding or decoding process and signal one or more packets, according to the modified encoding or decoding process, to the Bluetooth component of device 110-a. Device 110-a (e.g., Bluetooth component of device 110-a) may transmit the one or more packets (e.g., encoded according to the modified codec configuration, adjusted audio bitrate, etc.) to the paired device 115-a.

Figure 2:
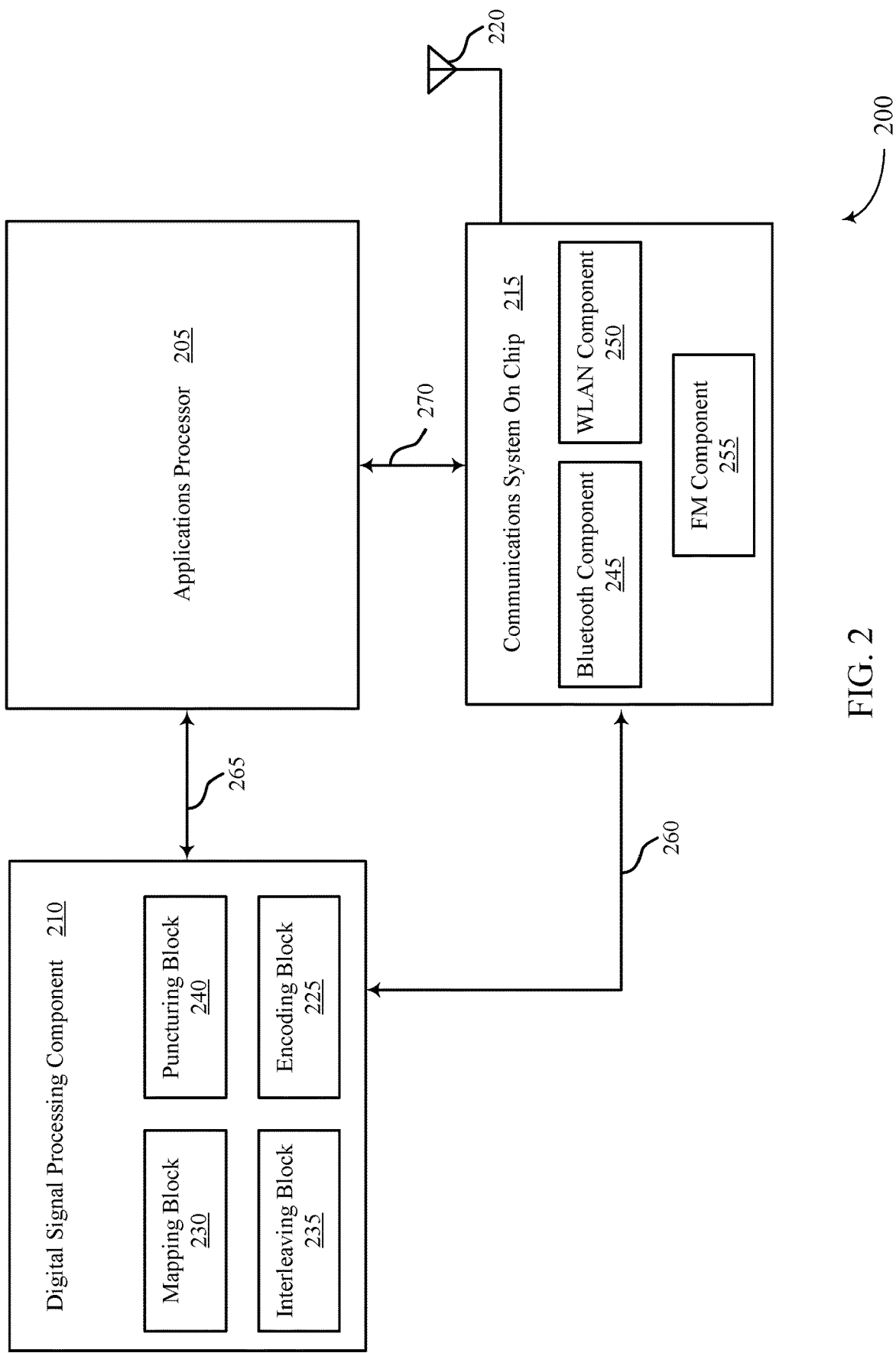
FIG. 2 shows a block diagram of a device that supports power efficient metadata transport signaling mechanisms for codec control and configuration in accordance with aspects of the present disclosure.

FIG. 2 illustrates an example of a block diagram 200 of a device (e.g., which may be an example of a device 110 or a device 505, as described herein) that supports power efficient metadata transport signaling mechanisms for codec control and configuration in accordance with aspects of the present disclosure. In some examples, block diagram 200 may implement aspects of wireless communications system 100. The device illustrated by block diagram 200 may include an applications processor 205, a DSP component 210, a communications system on chip (SoC) 215, and an antenna 220. Each of these components may be in communication with one another (e.g., via one or more buses or links, such as link 260, link 265, and link 270).

An applications processor 205 may be or include an intelligent hardware device, (e.g., a general-purpose processor, a CPU, a microcontroller, an ASIC, an FPGA, a programmable logic device, a discrete gate or transistor logic component, a discrete hardware component, or any combination thereof). In some cases, applications processor 205 may be configured to execute computer-readable instructions stored in a memory to perform various functions (e.g., functions or tasks supporting applications, aspects of DSP, aspects of Bluetooth communication, etc.). In some cases, applications processor 205 may refer to a host. In some cases, applications processor 205 may consume more power relative to DSP component 210 and SoC 215.

DSP component 210 may include suitable logic, circuitry and/or code that may perform digital signal processing operations. For example, DSP component may include an encoding block 225, a mapping block 230, a puncturing block 240, and an interleaving block 235, each of which may perform aspects of DSP operations performed by a device. Other configurations of a DSP component 210 are contemplated, without departing from the scope of the present disclosure (e.g., DSP component 210 may include additional subcomponents, DSP component 210 may include a subset of the illustrated subcomponents). Each subcomponent of DSP component 210 may include suitable logic, circuitry and/or code to perform their respective functions. In some cases, DSP component 210 may be referred to as an ADSP.

SoC 215 may include suitable logic, circuitry and/or code that may, for example, control or coordinate communications associated with different communication protocols. For example, SoC 215 may include Bluetooth component 245 (e.g., a Bluetooth chip), WLAN component 250, and FM component 255. In some cases, Bluetooth and WLAN in the 2.4 GHz industrial, scientific and medical (ISM) band may share the same unlicensed frequency medium. In some cases, the SoC 215 may coordinate Bluetooth component 245, WLAN component 250, and FM component 255 for avoiding interference in domains such as frequency, power, and time (e.g., as in some cases, Bluetooth component 245, WLAN component 250, and FM component 255 may share the same antenna 220). Frequency domain techniques may include adaptive frequency hopping (AFH), and power domain techniques may include power back-off or de-boosting. Time domain techniques may include some form of frame alignment.

In some cases, the device may include a single antenna 220. However, in some cases the device may have more than one antenna 220, which may be capable of concurrently and/or simultaneously transmitting or receiving multiple wireless transmissions. In some examples, a device may include a transceiver that may communicate bi-directionally, via one or more antennas 220, wired, or wireless links as described above. For example, a transceiver may represent a wireless transceiver and may communicate bi-directionally with another wireless transceiver (e.g., of a paired device). The transceiver may also include a modem to modulate the packets and provide the modulated packets to the antennas 220 for transmission, and to demodulate packets received from the antennas 220.

In accordance with aspects of the present disclosure, information (e.g., data, audio) to be sent to a paired device (e.g., such as a Bluetooth headset) may be encoded at the DSP component 210 (e.g., at the encoding block 225). The encoded data may be signaled (e.g., passed or sent across) to Bluetooth component 245 via link 260, and the Bluetooth component 245 may transmit the encoded data to the paired device (e.g., via antenna 220). In some cases, information may be received from a paired device (e.g., via antenna 220), and may be sent to the DSP component 210 (e.g., where the information may be decoded).

In some cases, the applications processor 205 may control aspects of the DSP component 210 (e.g., in some cases, some subcomponents of DSP component 210 may be implemented at applications processor 205, or applications processor 205 may control other aspects of DSP component 210). For example, in some cases, applications processor 205 may indicate an encoding scheme (e.g., an audio bitrate) to the DSP component 210 (e.g., via link 265), and the DSP component 210 may encode data via encoding block 225 according to the indicated encoding scheme. As described herein, however, in some cases operation of applications processor 205 may be costly in terms of power consumption. As such, the device may support the described power efficient metadata transport signaling mechanisms for codec control and configuration techniques, which may provide for sideband information signaling between Bluetooth firmware (e.g., Bluetooth component 245) and the DSP component 210.

Data transfer between a Bluetooth component 245 and a DSP component 210 (e.g., an ADSP) may be supported over an interface such as link 260 (e.g., a SLIMbus) using, for example, a CoP format. A CoP format may be modified to transport additional metadata (e.g., sideband data). The modified format may be used to support sideband data transfer in both directions (e.g., from a DSP component 210 to a Bluetooth component 245 and from a Bluetooth component 245 to a DSP component 210). For example, in some cases, the sideband data may be transported to convey parameter control information (e.g., control information for codec parameter control interfaces, such as information for quality mode changes), in band data (e.g., additional information indicating data specific parameters, such as timestamps for playback timing control and audio-to-video synchronization (AVSync) purposes), etc.

Sideband data (e.g., a modified CoP format including sideband data) may be transported (e.g., communicated) over link 260 between a Bluetooth component 245 and a DSP component 210 while applications processor 205 (or other processor in communication with the DSP) is operating in a low power state or sleep mode. In some examples, sideband data may include an encoding parameter (e.g., identified by a Bluetooth component 245 based on an encoding mode condition, link conditions, etc.), and may be conveyed to the DSP component 210 such that an encoding or decoding process (e.g., performed by encoding block 225) may be modified based on the sideband data (e.g., based on an encoding parameter included in sideband data). Additionally or alternatively, sideband data may include metadata (e.g., such as timestamp information) associated with a data payload (e.g., metadata associated with CoP data transfer over the link 260 between the Bluetooth component 245 and the DSP component 210 for a decoder module running on the DSP component 210). Such sideband data may be conveyed to the DSP component 210 such that the DSP component 210 may control a delivery time for optimizing a round trip latency, control a rate of data packet consumption, control a rate of data packet production, control a quality mask of encoded data packets, etc. (e.g., based on the sideband data).

In some examples, the Bluetooth component 245 may monitor link conditions (e.g., determine link quality or a link condition) between the device and a paired device. Link condition information may be sensed by the Bluetooth component 245, and sideband data (e.g., an encoding parameter) may be passed (e.g., directly) to the DSP component 210 via link 260. In some cases, such sideband data may include an encoding parameter (e.g., a codec configuration parameter, such as a bitrate), link condition information (e.g., one or more link condition parameters), etc., and may be signaled directly to the encoding block 225. For example, the direct signaling of link condition information from the Bluetooth component 245 to the DSP component 210 (e.g., or the encoding block 225) may alleviate the need to power other components of the device to process or pass on the link condition information. That is, as the sideband data may be passed or communicated directly between the Bluetooth component 245 and the DSP component 210, the applications processor 205 and other components may remain in a low power or sleep state.

Figure 3:
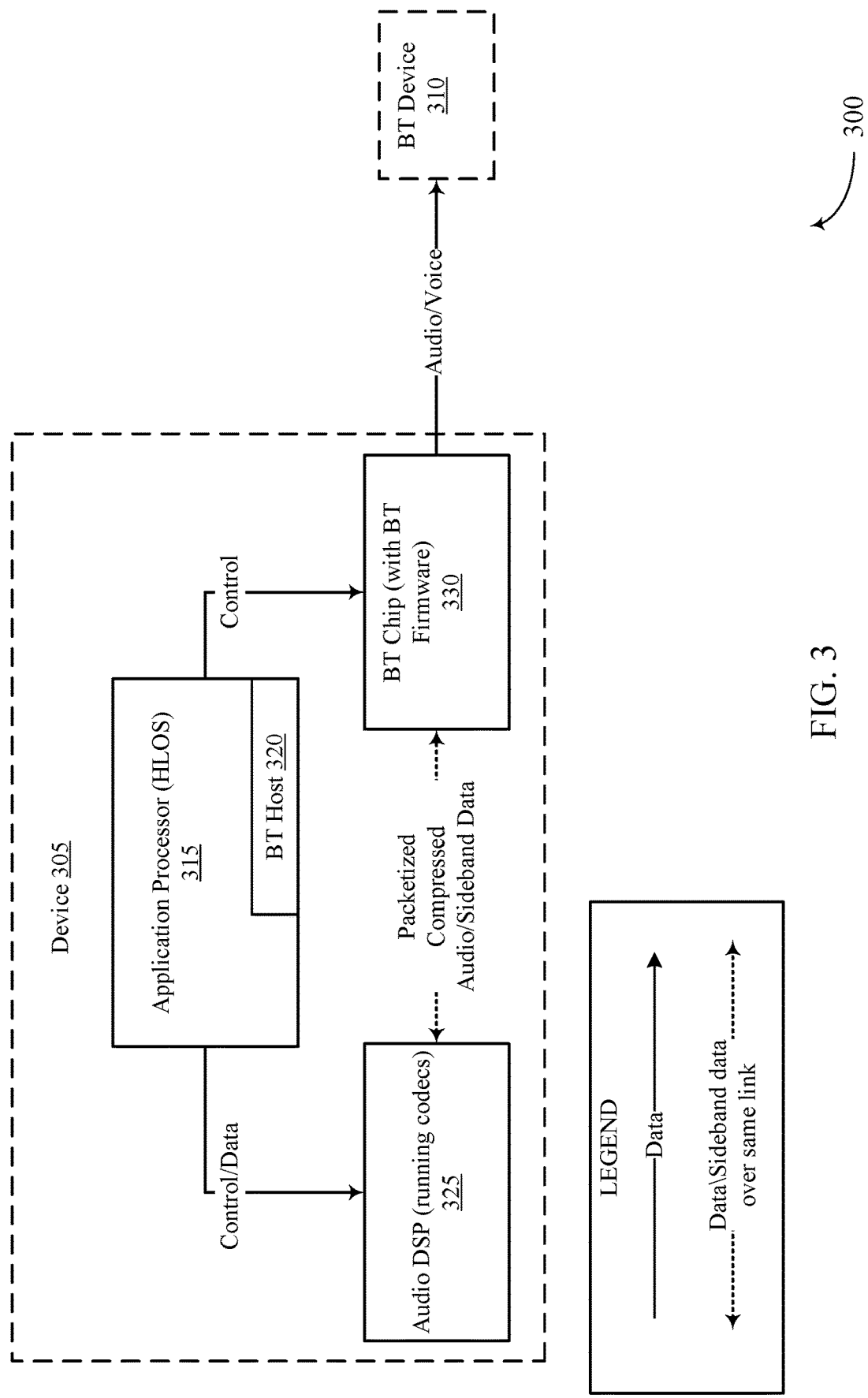
FIG. 3 illustrates an example of a system that supports power efficient metadata transport signaling mechanisms for codec control and configuration in accordance with aspects of the present disclosure.

FIG. 3 illustrates an example of a system 300 that supports power efficient metadata transport signaling mechanisms for codec control and configuration in accordance with aspects of the present disclosure. In some examples, system 300 may implement aspects of wireless communications system 100. For example, system 300 may include a device 305 and a Bluetooth (BT) device 310, which, in some cases, may be examples of a source device 110 and a paired device 115. System 300 may illustrate data transport across a Bluetooth (BT) chip 330 (e.g., a component running Bluetooth firmware), an ADSP 325 (e.g., a component running codecs), and an applications processor 315 (e.g., a high level operating system (HLOS).

In some architectures, data transfer between BT chip 330 and ADSP 325 may happen via a SLIMbus using CoP format. According to the described techniques, the CoP format may be modified and enhanced with the capability to transport additional metadata (e.g., which may be referred to as sideband data). The format enhancement may be used to support sideband data transfer capability in both directions (e.g., from ADSP 325 to BT chip 330 and from BT chip 330 to ADSP 325). In some cases, a BT chip 330 may refer to hardware supporting Bluetooth functionality (e.g., in some cases, a radio frequency transceiver and a microcontroller running a Bluetooth stack (firmware) may be included in a BT chip 330). Generally, a Bluetooth device (e.g., device 305 and BT device 310) may use a BT chip 330 to wirelessly transmit or receive control information or application data.

In some cases, an applications processor 315 may include or refer to a BT host 320. The applications processor 315 may communicate control and data with ADSP 325, and may communicate control information with BT chip 330. According to the described techniques, BT chip 330 and ADSP 325 may convey packetized compressed audio and sideband data (e.g., included in a CoP format) to each other. For example, device 305 may transport a first portion of a set of encoded data packets over an interface the ADSP 325 of the device 305 and the BT chip 330 of the device 305 (e.g., device 305 may transport a first portion of a set of encoded data packets from the ADSP 325 to the BT chip 330). The device 305 may transport, over the interface (e.g., from the BT chip 330 to the ADSP 325), a sideband packet including an encoding parameter for the set of encoded data packets. The device 305 (e.g., via the ADSP 325) may then modify an encoding or decoding process (e.g., configure a codec, adjust a bitrate, etc.) associated with the set of encoded data packets based at least in part on the sideband packet. The device 305 may then transport a second portion of the set of encoded data packets over the interface, where the second portion of the set of encoded data packets may be encoded according to the modified encoding or decoding process. As such, the device 305 may communicate with the BT device 310, and may support power efficient metadata transport signaling mechanisms for codec control and configuration described herein for communications with the BT device 310 based on the application, link conditions, etc.

FIGS. 4A, 4B, 4C, and 4D illustrate example packet format 400, example packet format 401, example packet format 402, and example packet format 403, respectively. Example packet format 400, example packet format 401, example packet format 402, and example packet format 403 may support power efficient metadata transport signaling mechanisms for codec control and configuration in accordance with aspects of the present disclosure. In some examples, example packet format 400, example packet format 401, example packet format 402, and example packet format 403 may implement aspects of wireless communications system 100 (e.g., packet formats 400-403 may illustrate aspects of sideband data signaling and usage in CoP data packets between a Bluetooth component and a DSP component). In some cases, the fields of example packet formats 400-403 may be in a different order than the order shown. Certain fields also may be left out of the example packet formats 400-403, or other fields may be added to the example packet formats 400-403.

According to some aspects, a modified CoP format (e.g., a sideband packet) may include a sideband ID field and a sideband data payload (e.g., where the type, format, contents, etc. of the sideband data payload may be indicated by the sideband ID field). For example, a sideband ID field may indicate a structure of a sideband packet (e.g., of a sideband payload field), and may indicate whether the sideband payload field includes an encoding parameter, a sequence number, a timestamp, content protection information, a number of frames, delivery time information, a drift, a frame size, a quality mask, reserved information bits, or some combination thereof. In some cases, the CoP format may be modified to include multiple sideband payload fields (e.g., identified or indicated by multiple sideband ID fields).

CoP data packet may include a combination of 'Header' and variable fields representing data payload lengths, data payload, and padding information. CoP data packet may further include sideband data payload. As sideband data may not always be present, dedicated fields for such information may not always be reserved in every CoP packet to preserve bandwidth usage. Hence, CoP packet header may indicate presence or absence of sideband data. In some cases, multiple sidebands (e.g., sideband payloads) may be packed into a single CoP packet (e.g., which may be limited by the 'bit-width' of 'Num side bands' field) when sideband is present as indicated by CoP packet header. Using sideband method, different types of data may be transferred. In some cases different types of such data (e.g., sideband payloads) may be identified using different sideband IDs, which may be uniquely defined by the Bluetooth component and DSP component interfaces which are using this data transport mechanism. As the sideband data transport may be done using aspects of mechanisms for regular data (e.g., CoP formats for a direct transport between Bluetooth component and DSP component), communication of such sideband information may be power efficient as it avoids applications processor involvement (e.g., wherever applicable).

In the example of FIG. 4A, packet format 400 may illustrate a packet structure without sideband information. For example, without sideband information, a sideband present bit (e.g., in the Header field) may be set to zero (e.g., indicating no sideband information is included in the CoP packet format). Packet format 400 may include a Header field including header or identification information for the packet and/or packet payload, a Num frames field including information regarding the number of frames for the packet and/or packet payload, a Len field including information regarding the length of the packet and/or packet payload, a data packet field including payload information of the packet, a Zero stuff Len field including information regarding the length of a Zero-stuffing field, and a Zero-stuffing field (e.g., padding information).

In the example of FIG. 4B, packet format 401 may illustrate a packet structure with sideband information. For example, with sideband information, a sideband present indication may be included in the header (e.g., the Header may include one or more bits designated to indicate the presence or absence of sideband information in the CoP packet, and the one or more indication bits may be set in the example of FIG. 4B to indicate sideband information is included in the packet format 401). Every sideband ID may correspond to a predefined (e.g., device configured or hardware specified) structure, where the size, payload information, etc. may be determined based on the sideband ID. In the example packet format 401, two sideband payload fields may be included.

In general, packets transported between a Bluetooth component and a DSP component of a device (e.g., CoP packet formats) may include only a data payload and no sideband information (e.g., such as example packet format 400), one or more sideband payloads before data payload (e.g., such as example packet format 401), or only sideband payloads in the packet and no data payload (e.g., such as example packet formats 402 and 403). The sideband ID and payload may be optional and may be as many in number as bandwidth allows. The Header field of a packet may indicate whether sideband information is present in the packet. If sideband information is present, the packet may include a Num side-bands field including information regarding the number of sideband payloads, or sideband ID fields, included in the packet. Sideband header fields (e.g., Side-band hdr1, Sideband hdr2) may then indicate the structure of the corresponding sideband payload field. As such, a component receiving the packet (e.g., the CoP packet over SLIMbus), such as a DSP component, may identify whether the packet includes sideband information (e.g., from the Header of the packet), may identify a number of sideband information payloads (e.g., from the Num sidebands field of the packet), identify the structure of one or more sideband payload fields (e.g., from one or more sideband header fields of the packet), and receive and decode sideband data (e.g., from the one or more sideband payload fields, based on the structure of each sideband payload field).

Back to the example of FIG. 4B, packet format 401 may illustrate a packet structure with sideband information as well as additional data (e.g., such as packetized compressed audio). For example, packet format 401 may include sideband information as well as a Num frames field including information regarding the number of frames for the data packet payload, a Len field including information regarding the length of the data packet payload, a data packet field including data payload information of the packet, a Zero stuff Len field including information regarding the length of a Zero-stuffing field, and a Zero-stuffing field. As such, the packet format 401 may convey sideband data as well as other data. In some cases, such a packet format (or a similar format) may be used to convey sideband information (e.g., in band data or additional information) indicating data specific parameters (e.g., such as timestamps) for playback timing control, AVSync purposes, etc. associated with, for example, the additional data included in the packet.

In the example of FIG. 4C, packet format 402 may illustrate a packet structure with only sideband information (e.g., with no additional data payload), with zero stuffing. In the example of FIG. 4D, packet format 403 may illustrate a packet structure with only sideband information (e.g., with no additional data payload), with no zero stuffing or no number of subframes. In some cases, packet format 402 or packet format 403 (or the like) may be used in cases where sideband information is a one-time occurrence (e.g., to convey an encoding parameter via sideband information, when a Bluetooth component has determined some link condition has triggered a codec configuration change, a bitrate adjustment, etc.).

Figure 5A:
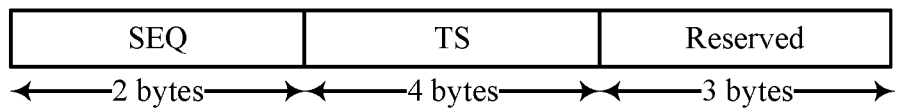
FIGS. 5A, 5B, and 5C illustrate example sideband data payloads that support power efficient metadata transport signaling mechanisms for codec control and configuration in accordance with aspects of the present disclosure.
Figure 5B:
Figure 5C:
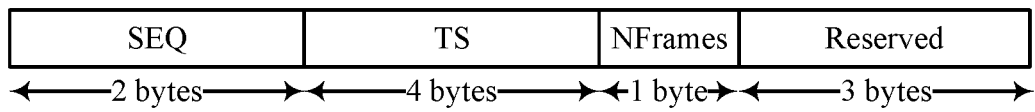

FIGS. 5A, 5B, and 5C illustrate example sideband data payload 500, example sideband data payload 501, and example sideband data payload 502, respectively. Example sideband data payload 500, example sideband data payload 501, and example sideband data payload 502 may support power efficient metadata transport signaling mechanisms for codec control and configuration in accordance with aspects of the present disclosure. In some examples, example sideband data payload 500, example sideband data payload 501, and example sideband data payload 502 may implement aspects of wireless communications system 100 (e.g., sideband data payloads 500-502 may illustrate aspects of sideband data signaling and usage in CoP data packets between a Bluetooth component and a DSP component). In some cases, the information of example sideband data payloads 500-502 may be included in a different order than the order shown. Certain information also may be left out of the example sideband data payloads 500-502, or other information may be added to the sideband data payloads 500-502.

As described herein, sideband data may be interpreted based on each sideband ID (e.g., a sideband data payload may be interpreted based on the structure indicated by the sideband ID field or sideband header), which both the sender (e.g., a Bluetooth component) and receiver (e.g., DSP component) may uniquely understand based on a predetermined sideband payload format (e.g., or structure) for a sideband ID. It may be the responsibility of the receiving and parsing framework to understand and send the data to intended destination modules (e.g., the destination DSP component or destination Bluetooth component) for further consumption. Sideband data payloads 500-502 may illustrate some examples of different sideband data payloads, where the format or structure of sideband data payloads 500-502 may be indicated by sideband ID information.

In the example of FIG. 5A, sideband data payload 500 (e.g., associated with a SIDE_BAND_INFO_MEDIA_HEADER_ID) may include 2 bytes of Sequence (SEQ) number information, 4 bytes of Timestamp (TS) information, and 3 reserved bytes. In the example of FIG. 5B, sideband data payload 501 (e.g., associated with a SIDE_BAND_INFO_MEDIA_HEADER_CP_ID) may include 2 bytes of Sequence (SEQ) number information, 4 bytes of Timestamp (TS) information, 1 byte of content protection (CP) information, and 3 reserved bytes. In the example of FIG. 5C, sideband data payload 502 (e.g., associated with a SIDE_BAND_INFO_MEDIA_HEADER_NUMFRAMES_ID) may include 2 bytes of Sequence (SEQ) number information, 4 bytes of Timestamp (TS) information, 1 byte of NumFrames (NFrames) information, and 3 reserved bytes.

FIG. 6 illustrates an example of a system 600 that supports power efficient metadata transport signaling mechanisms for codec control and configuration in accordance with aspects of the present disclosure. In some examples, system 600 may implement aspects of wireless communications system 100. For example, system 600 may include a device 605 and a Bluetooth (BT) device 620, which, in some cases, may be examples of a source device 110 and a paired device 115. System 600 may illustrate an A2DP source implementation where, for example, the combination of a DSP component (e.g., ADSP 610) and a BT Firmware (e.g., BT chip 615) system acts as an A2DP source, where the ADSP 610 and BT chip 615 system sends encoded data to a Bluetooth sink (e.g., BT device 620, such as a Bluetooth headset or Bluetooth speaker devices).

In general, sideband data transport mechanisms described herein may be used to send different types of metadata payloads used for specific requirements of an implementation or use case. In the example of FIG. 6, system 600 may illustrate an A2DP source implementation (e.g., where ADSP 610 and BT chip 615 may exchange sideband information, and act as an A2DP source and send encoded data to a Bluetooth sink).

For example, dynamic configuration of mode of an encoder module running on an ADSP 610 may be based on BT Firmware (BT chip 615) to BT device 620 link condition(s). BT Firmware (BT chip 615) may use techniques described herein (e.g., CoP data transport mechanisms) to send the mode change payload via the specific sideband ID, whenever a mode change is to be performed. That is, BT chip 615 may identify link conditions between the BT chip 615 and the BT device 620, and may convey sideband information (e.g., an encoding parameter) to ADSP 610. The CoP packet format may include an appropriate sideband ID indicating the structure (e.g., format, length, payload information, etc.) of such sideband information for encoder module configuration. The ADSP 610 may receive this sideband payload, understand the payload information based on the sideband ID, and send the data as required by the encoder module to change the encoding mode. Note that this is a condition in which encoder may be receiving input data and mode configuration data via different paths (e.g., asynchronous mode of control). Such a mechanism may avoid multiple hops (e.g., from BT firmware to BT application layer to Audio Application layer to send the data to ADSP), as the sideband data may be sent from the BT firmware directly to the ADSP.

Figure 7:
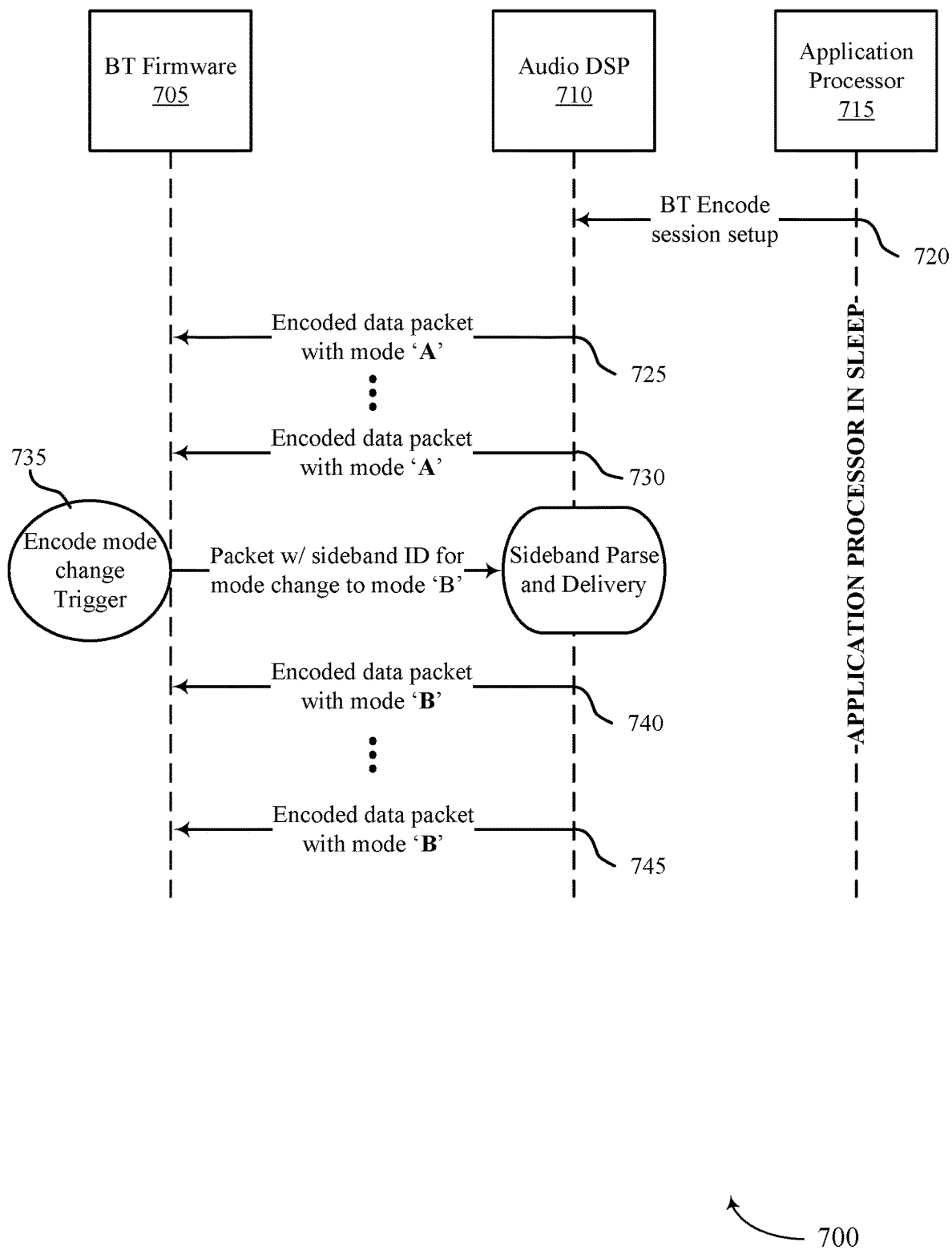
FIG. 7 illustrates an example of a process flow that supports power efficient metadata transport signaling mechanisms for codec control and configuration in accordance with aspects of the present disclosure.

FIG. 7 illustrates an example of a process flow 700 that supports power efficient metadata transport signaling mechanisms for codec control and configuration in accordance with aspects of the present disclosure. In some examples, process flow 700 may implement aspects of wireless communications system 100. For example, process flow 700 may illustrate signaling between components of a device (e.g., such as a source device 110). In the following description of the process flow 700, the operations between BT firmware 705, ADSP 710, and applications processor 715 may be signaled or transported in a different order than the order shown, or the operations performed by BT firmware 705, ADSP 710, and applications processor 715 may be performed in different orders or at different times. Certain operations also may be left out of the process flow 700, or other operations may be added to the process flow 700.

At 720, applications processor 715 may signal a BT encode session setup message to the ADSP 710. In some cases, the BT encode session setup message may establish a Bluetooth encode session, configure a codec, configure an encoder mode, etc. (e.g., based on a set up Bluetooth session, an application, etc.). According to the techniques described herein, in some cases, the applications processor 715 may operate in a low power or sleep state after the BT encode session setup.

At 725, ADSP 710 may signal an encoded data packet with some encoder mode (e.g., mode 'A') to BT firmware 705. For example, mode 'A' may refer to some encoder mode, codec configuration, etc. used to encode data packets, and the ADSP 710 may signal an encoded data packet to BT firmware 705 (e.g., and BT firmware may communicate the encoded data packet to a Bluetooth device, such as some paired device 115). In some cases, mode 'A' may refer to a configuration indicated by the BT encode session setup message. At 730, ADSP 710 may signal an encoded data packet (e.g., encoded according to encoder mode 'A') to BT firmware 705. Such may be repeated any number of times (e.g., various data packets may be encoded according to mode 'A' and transported to BT firmware 705 for Bluetooth communications with another device).

At 725, BT firmware 705 may identify some encode mode change trigger, and may transport a packet (e.g., CoP format packet) with sideband ID for a mode change to some mode 'B'. ADSP 710 may parse the sideband information, and deliver any appropriate information to components of the ADSP 710 (e.g., such as an encoder module of the ADSP 710, a decoder module of the ADSP 710, etc.) to modify an encoding or decoding process in accordance with the sideband information. For example, in some cases the BT firmware 705 may sense link conditions and determine some link conditions have satisfied a threshold triggering an encode mode change (e.g., link conditions may have deteriorated below a threshold such that a reduced bitrate may be triggered, link conditions may have improved beyond a threshold such that an increased bitrate may be triggered, etc.). The BT firmware 705 (e.g., a Bluetooth component) may then generate a CoP packet format (e.g., including a sideband ID and sideband data payload) to include sideband information (e.g., an encoding parameter) and transport the information to the ADSP 710. The ADSP 710 may receive the information (e.g., the sideband packet) and modify an encoding or decoding process (e.g., configure a codec, adjust a bitrate, etc.) accordingly.

At 740, ADSP 710 may signal an encoded data packet with some encoder mode (e.g., mode 'B') to BT firmware 705. For example, mode 'B' may refer to some modified or new encoder mode, codec configuration, etc. used to encode data packets, and the ADSP 710 may signal an encoded data packet to BT firmware 705 (e.g., and BT firmware may communicate the encoded data packet to a Bluetooth device, such as some paired device 115). In some cases, mode 'B' may refer to a configuration modified or determined based on the packet w/sideband ID for mode change to mode 'B' received at 735 by the ADSP 710. At 745, ADSP 710 may signal an encoded data packet (e.g., encoded according to encoder mode 'B') to BT firmware 705. Such may be repeated any number of times (e.g., various data packets may be encoded according to mode 'B' and transported to BT firmware 705 for Bluetooth communications with another device). In some cases, data packets encoded according to mode 'A' (e.g., transported at 725-730) may be referred to as a first portion of a plurality of encoded data packets, and data packets encoded according to mode 'B' (e.g., transported at 740-745) may be referred to as a second portion of the plurality of encoded data packets.

Figure 8:
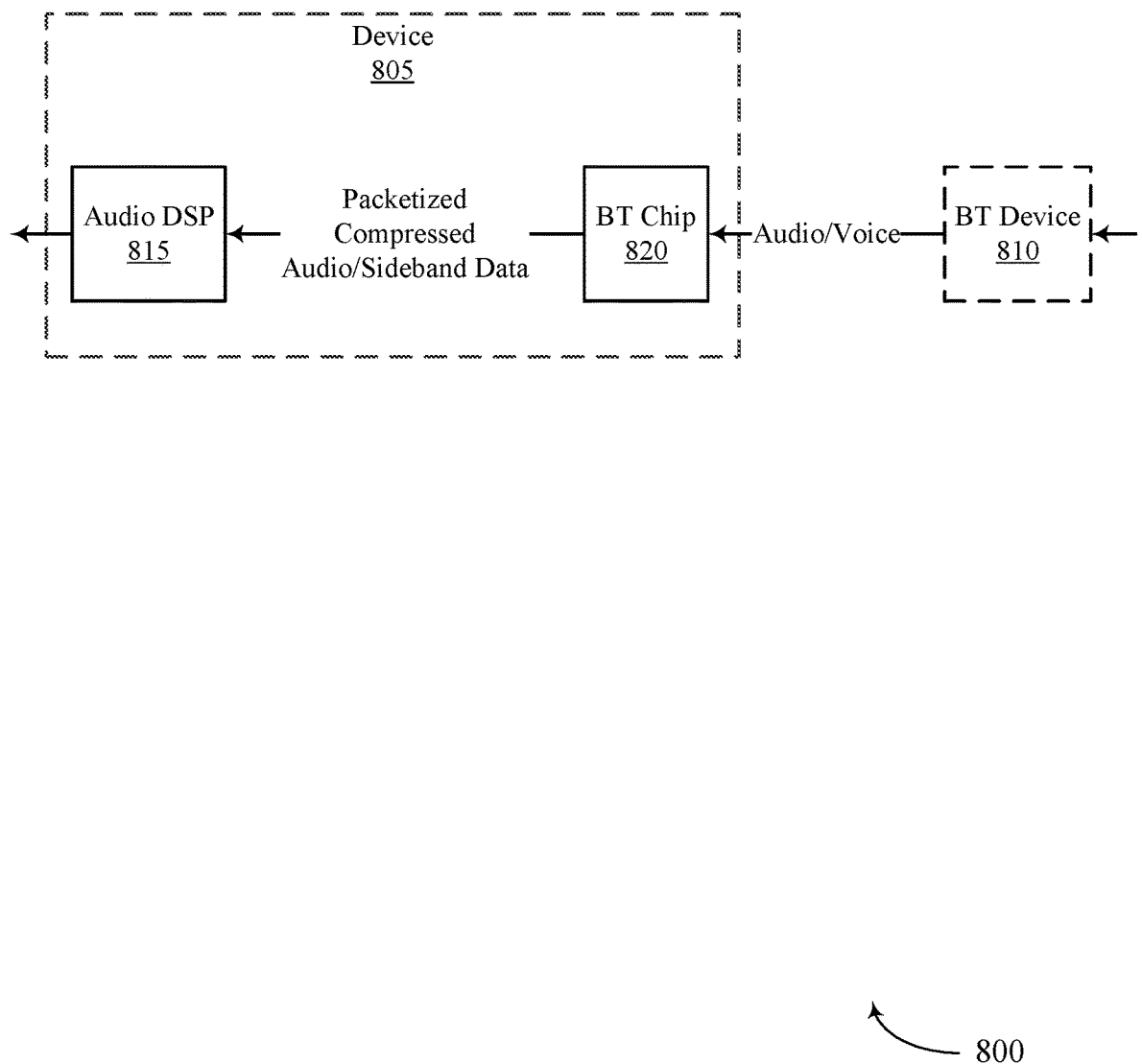
FIG. 8 illustrates an example of a system that supports power efficient metadata transport signaling mechanisms for codec control and configuration in accordance with aspects of the present disclosure.

FIG. 8 illustrates an example of a system 800 that supports power efficient metadata transport signaling mechanisms for codec control and configuration in accordance with aspects of the present disclosure. In some examples, system 800 may implement aspects of wireless communications system 100. For example, system 800 may include a device 805 and a Bluetooth (BT) device 810, which, in some cases, may be examples of a paired device 115 and a source device 110. System 800 may illustrate an A2DP sink implementation where, for example, the combination of a DSP component (e.g., ADSP 815) and a BT Firmware (e.g., BT chip 820) system acts as an A2DP sink, where the ADSP 815 and BT chip 820 system receives encoded data from a Bluetooth source (e.g., BT device 810, such as a mobile device or Bluetooth transmitter device).

In general, sideband data transport mechanisms described herein may be used to send different types of metadata payloads used for specific requirements of an implementation or use case. In the example of FIG. 8, system 800 may illustrate an A2DP sink use case where the combination of an ADSP 815 and BT Firmware (e.g., BT chip 820) system acts as an A2DP sink, which receives encoded data from BT source (e.g., BT device 810) such as a Mobile or Bluetooth transmitter device, decodes the encoded data, and renders audio output on connected output device, such as local speaker, connected headphones, HDMI output, etc. In such cases, the techniques described herein may be used for transport of timestamp metadata associated with data payload for a decoder module running on ADSP 815.

For example, BT firmware (e.g., a Bluetooth component or BT chip 820) may use the CoP data transport mechanism to send both a data payload and associated timestamp metadata using the sideband ID specific to send timestamps information. ADSP 815 may receive this sideband payload along with data, understand the sideband payload information based on the sideband ID, and send the data as required by the decoder module along with data payload, to use the timestamps information and produce output data with associated timestamps for playback control. Note that this is a condition in which decoder is receiving input data and metadata via same path (e.g., synchronous mode of control is possible). As such, an encoded packet and packet information (e.g., timestamps information) may be conveyed from the BT chip 820 to the ADSP 815 without waking up or relying on an applications processor. The ADSP 815 may utilize sideband information to process and playback without involvement from the applications processor (e.g., and the session may not have to be restarted or stalled to ensure synchronization).

In some cases, the ADSP 815 may utilize sideband information to control a delivery time for optimizing a round trip latency, control a rate of data packet consumption, control a rate of data packet production, a quality mask of encoded data packets, or some combination thereof. In some cases, a decoder module of the ADSP 815 may utilize a timestamp (e.g., associated with a first encoded data packet) included in the sideband information to modify a decoding process.

Figure 9:
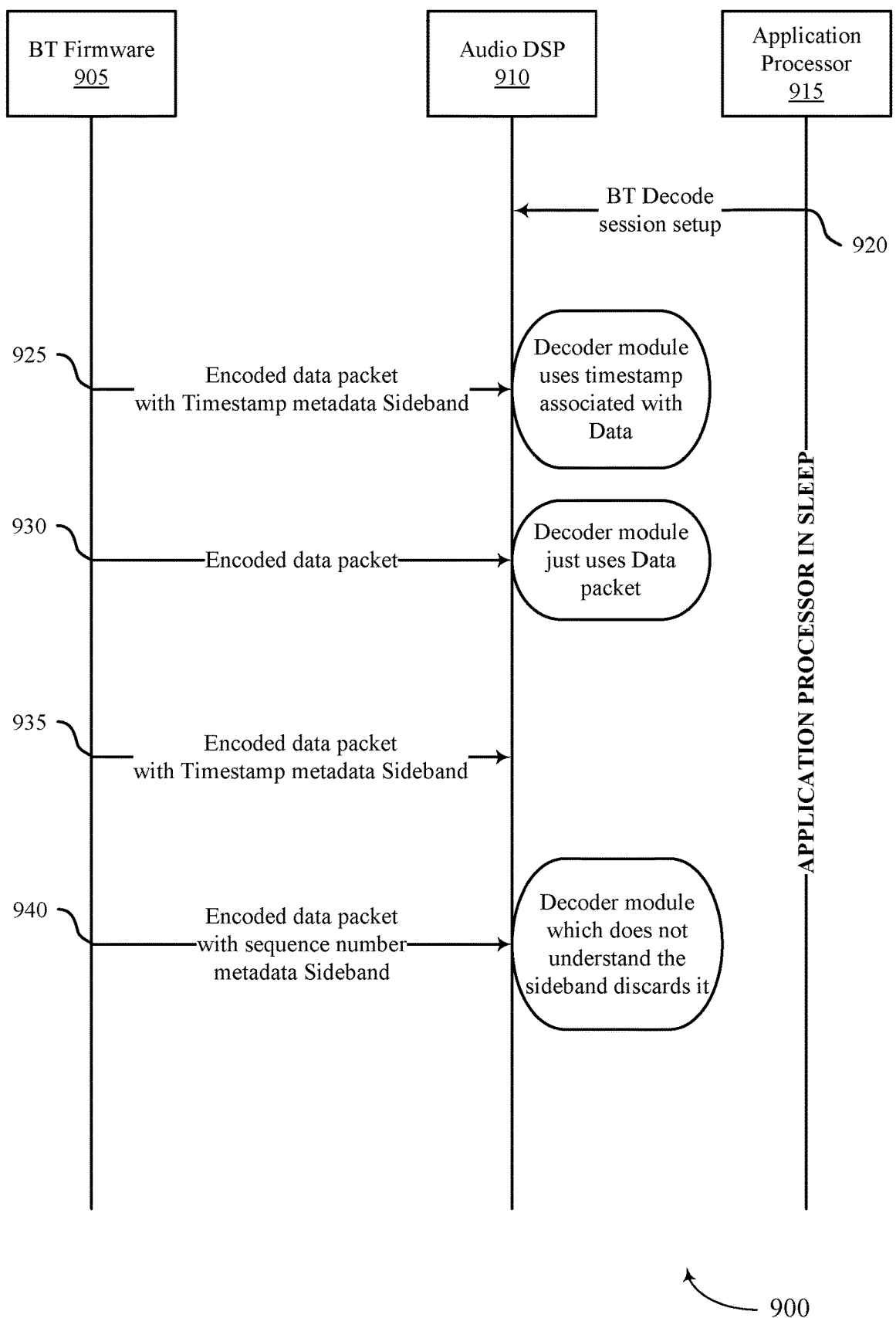
FIG. 9 illustrates an example of a process flow that supports power efficient metadata transport signaling mechanisms for codec control and configuration in accordance with aspects of the present disclosure.

FIG. 9 illustrates an example of a process flow 900 that supports power efficient metadata transport signaling mechanisms for codec control and configuration in accordance with aspects of the present disclosure. In some examples, process flow 900 may implement aspects of wireless communications system 100. For example, process flow 900 may illustrate signaling between components of a device. In the following description of the process flow 900, the operations between BT firmware 905, ADSP 910, and applications processor 915 may be signaled or transported in a different order than the order shown, or the operations performed by BT firmware 905, ADSP 910, and applications processor 915 may be performed in different orders or at different times. Certain operations also may be left out of the process flow 900, or other operations may be added to the process flow 900.

At 920, applications processor 915 may signal a BT decode session setup message to the ADSP 910. In some cases, the BT decode session setup message may establish a Bluetooth decode session, configure a codec, configure an decoder mode, etc. (e.g., based on a set up Bluetooth session, an application, etc.). According to the techniques described herein, in some cases, the applications processor 915 may operate in a low power or sleep state after the BT decode session setup.

At 925, BT firmware 905 may signal or transport an encoded data packet with timestamp metadata sideband information to ADSP 910. A decoder module of the ADSP 910 may use the timestamp information associated with the data (e.g., for playback timing control, AVSync purposes, etc.). At 930, BT firmware 905 may signal or transport an encoded data packet to ADSP 910. A decoder module of the ADSP 910 may just use the data packet. At 935, BT firmware 905 may signal or transport an encoded data packet with timestamp metadata sideband information to ADSP 910. At 940, BT firmware 905 may signal or transport an encoded data packet with sequence number metadata sideband information to ADSP 910. A decoder module of the ADSP 910 which does not understand the sideband data may discard the encoded data packet with sequence number metadata sideband information.

Figure 10:
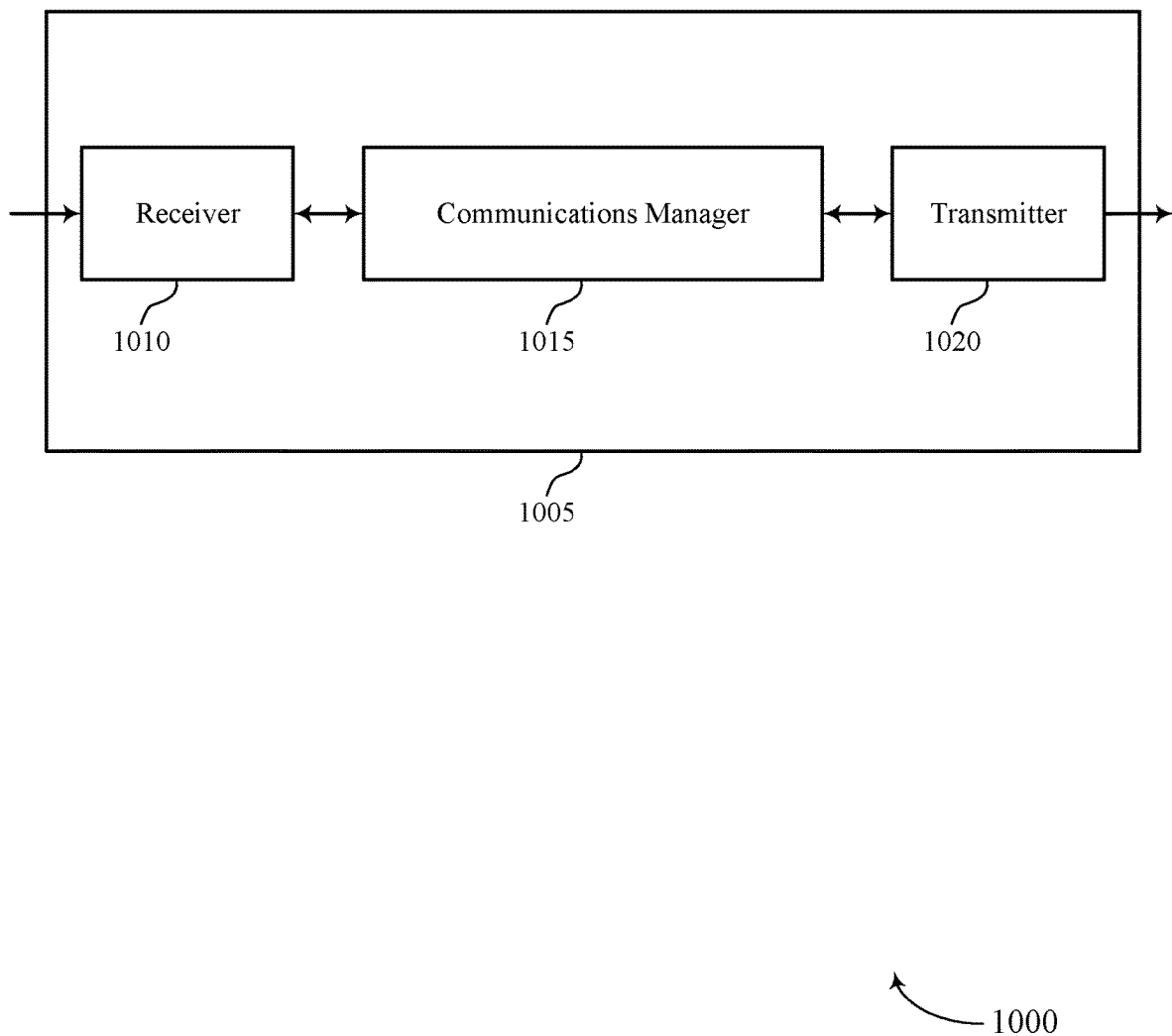
FIGS. 10 and 11 show block diagrams of devices that support power efficient metadata transport signaling mechanisms for codec control and configuration in accordance with aspects of the present disclosure.

FIG. 10 shows a block diagram 1000 of a device 1005 that supports power efficient metadata transport signaling mechanisms for codec control and configuration in accordance with aspects of the present disclosure. The device 1005 may be an example of aspects of a device as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to power efficient metadata transport signaling mechanisms for codec control and configuration, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transport a first portion of a set of encoded data packets over an interface between a Bluetooth component of the wireless device and a digital signal processor of the wireless device, transport a second portion of the set of encoded data packets over the interface, where the second portion of the set of encoded data packets is encoded according to the modified encoding or decoding process, transport over the interface a sideband packet including an encoding parameter for the set of encoded data packets, and modify an encoding or decoding process associated with the set of encoded data packets based on the sideband packet. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
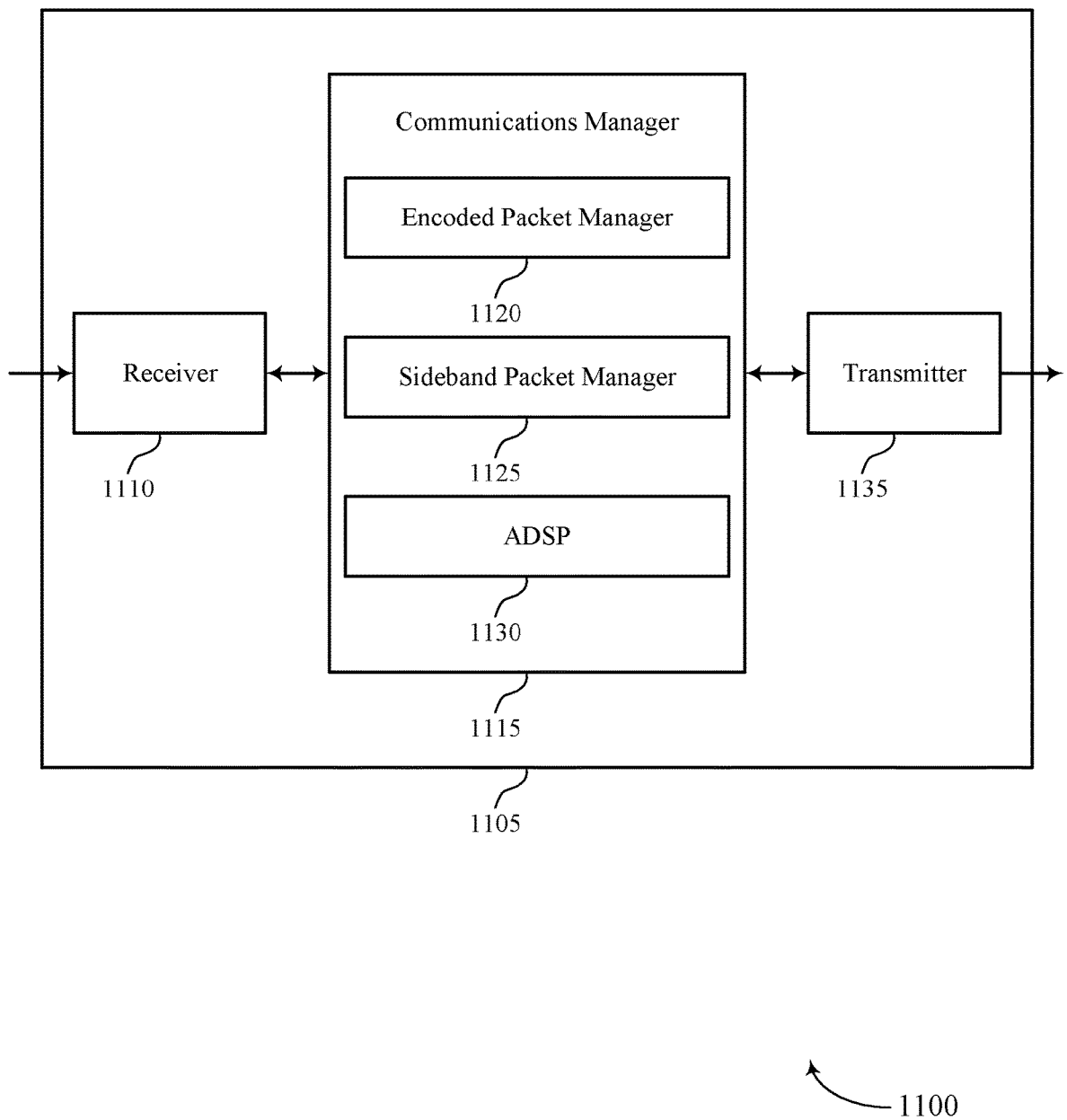

FIG. 11 shows a block diagram 1100 of a device 1105 that supports power efficient metadata transport signaling mechanisms for codec control and configuration in accordance with aspects of the present disclosure. The device 1105 may be an example of aspects of a device 1005, a source device 110, and/or a paired device 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to power efficient metadata transport signaling mechanisms for codec control and configuration, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an encoded packet manager 1120, a sideband packet manager 1125, and an ADSP 1130. The communications manager 1115 may be an example of aspects of the communications manager 1310 described herein.

The encoded packet manager 1120 may transport a first portion of a set of encoded data packets over an interface between a Bluetooth component of the wireless device and a digital signal processor of the wireless device and transport a second portion of the set of encoded data packets over the interface, where the second portion of the set of encoded data packets is encoded according to the modified encoding or decoding process. The sideband packet manager 1125 may transport over the interface a sideband packet including an encoding parameter for the set of encoded data packets. The ADSP 1130 may modify an encoding or decoding process associated with the set of encoded data packets based on the sideband packet.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
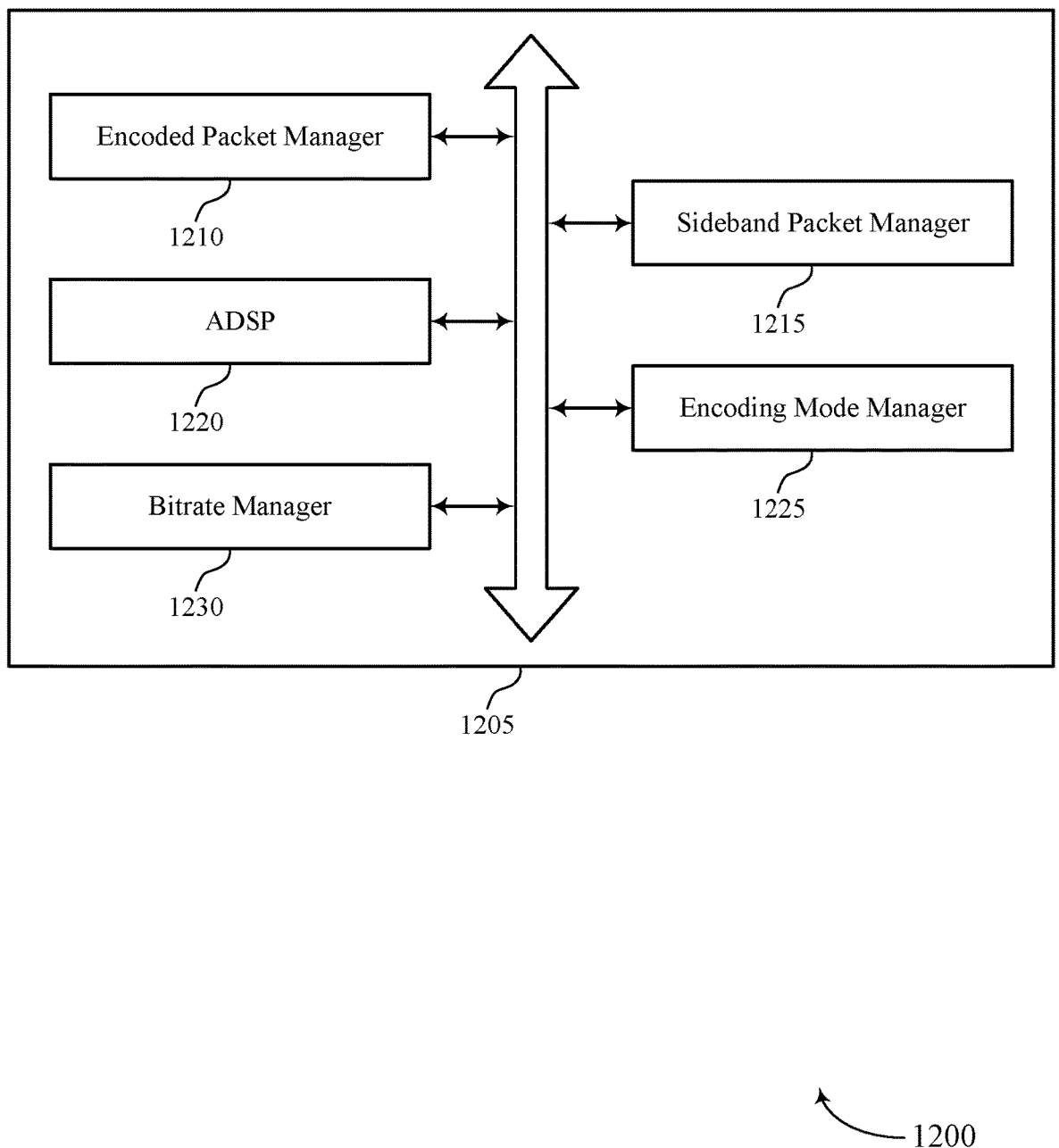
FIG. 12 shows a block diagram of a communications manager that supports power efficient metadata transport signaling mechanisms for codec control and configuration in accordance with aspects of the present disclosure.

FIG. 12 shows a block diagram 1200 of a communications manager 1205 that supports power efficient metadata transport signaling mechanisms for codec control and configuration in accordance with aspects of the present disclosure. The communications manager 1205 may be an example of aspects of a communications manager 1015, a communications manager 1115, or a communications manager 1310 described herein. The communications manager 1205 may include an encoded packet manager 1210, a sideband packet manager 1215, an ADSP 1220, an encoding mode manager 1225, and a bitrate manager 1230. Each of these modules may communicate, directly or indirectly, with one another (e.g., via one or more buses).

The encoded packet manager 1210 may transport a first portion of a set of encoded data packets over an interface between a Bluetooth component of the wireless device and a digital signal processor of the wireless device. In some examples, the encoded packet manager 1210 may transport a second portion of the set of encoded data packets over the interface, where the second portion of the set of encoded data packets is encoded according to the modified encoding or decoding process.

The sideband packet manager 1215 may transport over the interface a sideband packet including an encoding parameter for the set of encoded data packets. In some examples, sideband packet manager 1215 may transport a data payload over the interface, where the sideband packet further includes metadata associated with the data payload. In some examples, the sideband packet manager 1215 may identify a sideband identification field of the sideband packet, where a data payload of the sideband packet is based on the identified sideband identification field.

In some cases, the sideband identification field indicates a structure of a sideband payload field, a format of the sideband packet, or both. In some cases, the data payload includes a sequence number, a timestamp, content protection information, a number of frames, delivery time information, a drift, a frame size, a quality mask, reserved information bits, or some combination thereof. In some cases, the sideband packet includes framework control information. In some cases, the sideband packet includes multiple sideband payload fields. In some cases, the sideband packet is transported over the interface based on a compressed over pulse-code modulation format. In some cases, the sideband packet is transported over the interface from the Bluetooth component of the wireless device to the digital signal processor of the wireless device. In some cases, the sideband packet is transported over the interface from the digital signal processor of the wireless device to the Bluetooth component of the wireless device.

The ADSP 1220 may modify an encoding or decoding process associated with the set of encoded data packets based on the sideband packet. In some examples, the ADSP 1220 may identify, at a decoder module of the digital signal processor (e.g., at a decoder module of the ADSP), a timestamp associated with a first encoded data packet of the first portion of the set of encoded data packets based on the encoding parameter, where the decoding process is modified based on the identified timestamp. The encoding mode manager 1225 may identify an encoding mode condition. In some examples, the encoding mode manager 1225 may identify an encoding mode for the second portion of the set of encoded data packets based on the identified encoding mode condition, where the encoding parameter is based on the identified encoding mode. The bitrate manager 1230 may identify a link condition. In some examples, the bitrate manager 1230 may identify a bitrate for the second portion of the set of encoded data packets based on the identified link condition, where the encoding parameter is based on the identified bitrate. In some examples, the ADSP 1220 may control a delivery time for optimizing a round trip latency, a rate of data packet consumption, a rate of data packet production, a quality mask of encoded data packets, or some combination thereof, based on the sideband packet.

Figure 13:
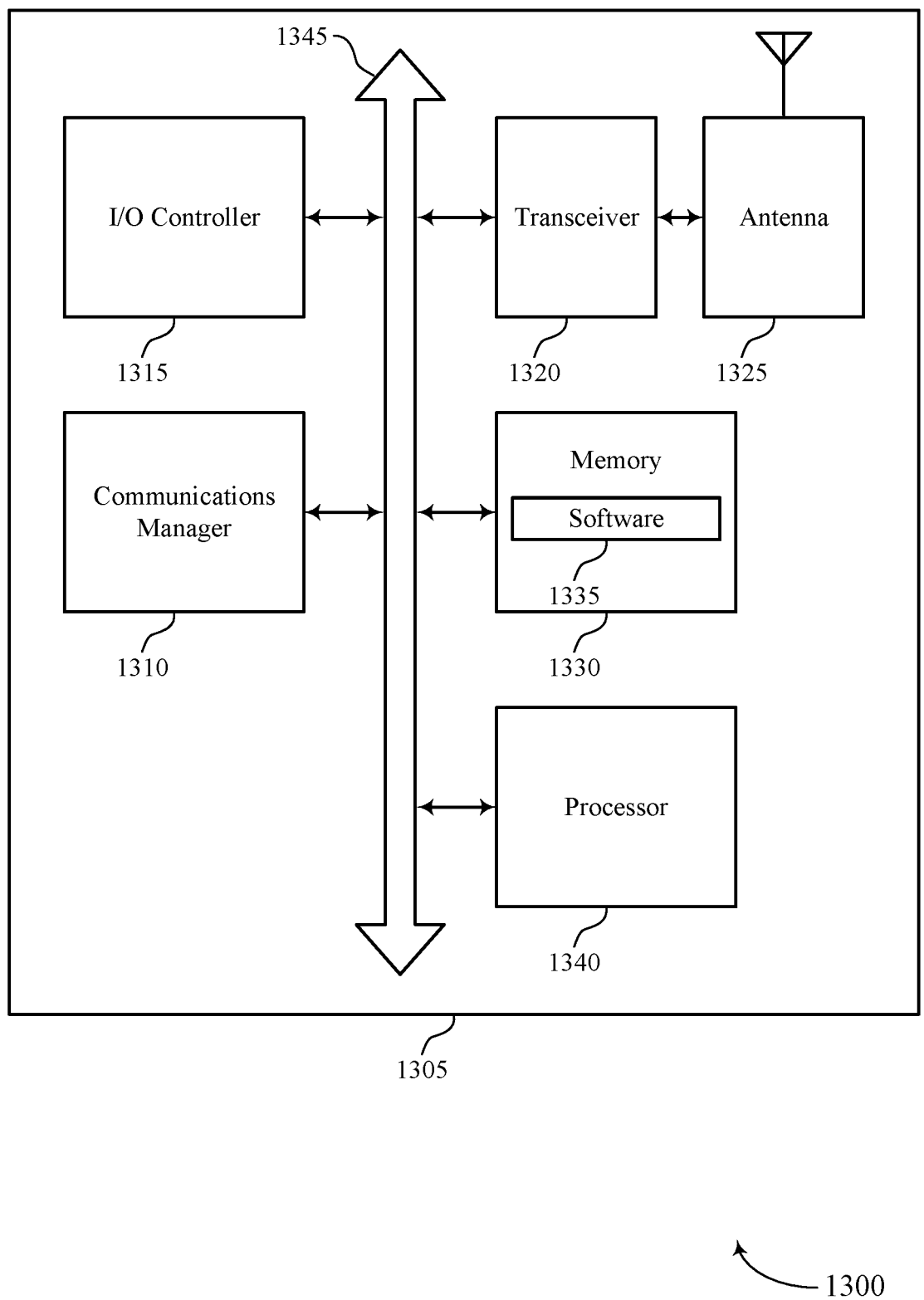
FIG. 13 shows a diagram of a system including a device that supports power efficient metadata transport signaling mechanisms for codec control and configuration in accordance with aspects of the present disclosure.

FIG. 13 shows a diagram of a system 1300 including a device 1305 that supports power efficient metadata transport signaling mechanisms for codec control and configuration in accordance with aspects of the present disclosure. The device 1305 may be an example of or include the components of device 1005, device 1105, a source device 110, and/or a paired device 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may transport a first portion of a set of encoded data packets over an interface between a Bluetooth component of the wireless device and a digital signal processor of the wireless device, transport a second portion of the set of encoded data packets over the interface, where the second portion of the set of encoded data packets is encoded according to the modified encoding or decoding process, transport over the interface a sideband packet including an encoding parameter for the set of encoded data packets, and modify an encoding or decoding process associated with the set of encoded data packets based on the sideband packet.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code or software 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting power efficient metadata transport signaling mechanisms for codec control and configuration).

The software 1335 may include instructions to implement aspects of the present disclosure, including instructions to support communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
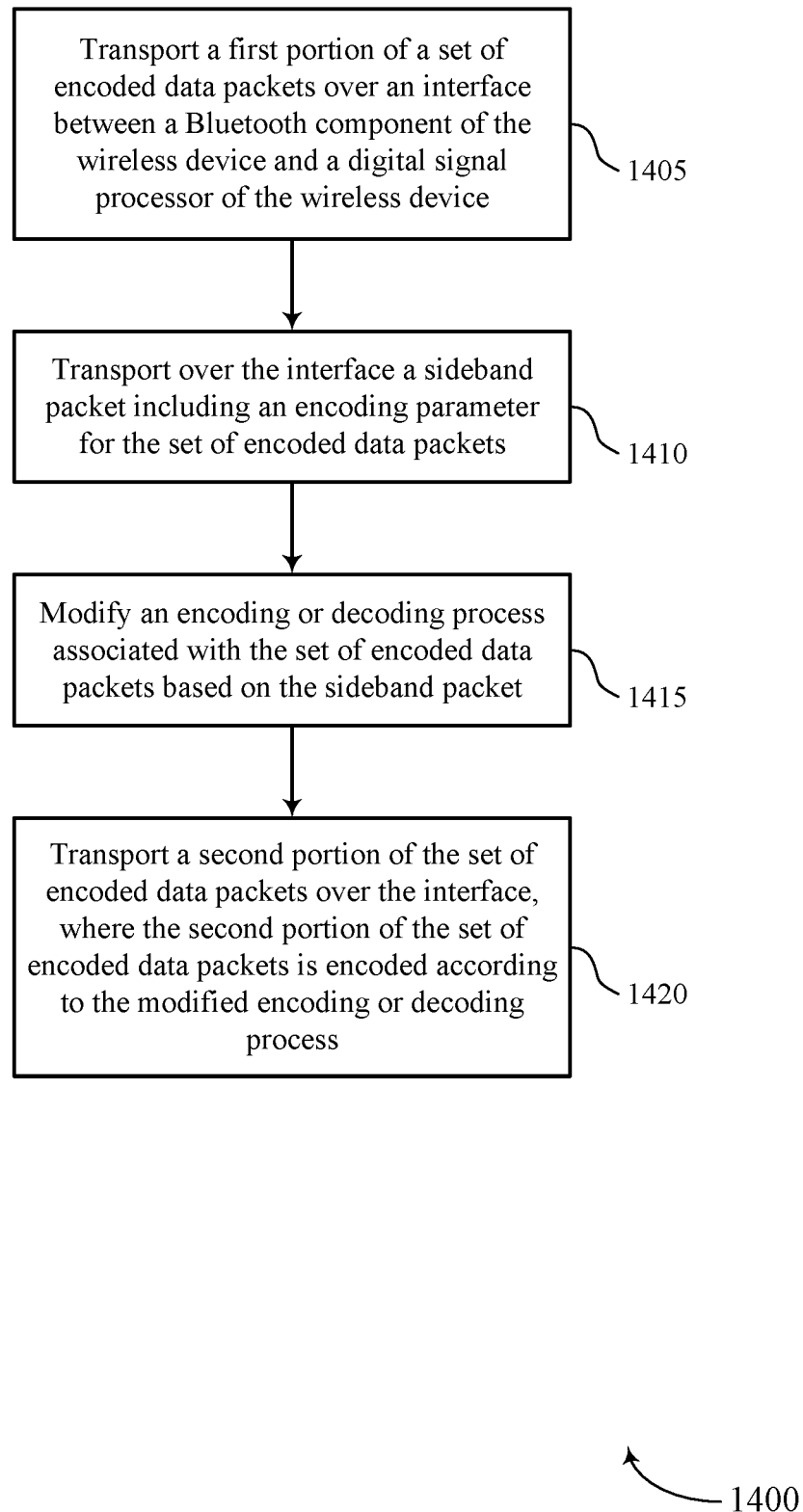
FIGS. 14 through 16 show flowcharts illustrating methods that support power efficient metadata transport signaling mechanisms for codec control and configuration in accordance with aspects of the present disclosure.

FIG. 14 shows a flowchart illustrating a method 1400 that supports power efficient metadata transport signaling mechanisms for codec control and configuration in accordance with aspects of the present disclosure. The operations of method 1400 may be implemented by a device or its components as described herein. For example, the operations of method 1400 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1405, the device may transport a first portion of a set of encoded data packets over an interface between a Bluetooth component of the wireless device and a digital signal processor of the wireless device. The operations of 1405 may be performed according to the methods described herein. In some examples, aspects of the operations of 1405 may be performed by an encoded packet manager as described with reference to FIGS. 10 through 13.

At 1410, the device may transport over the interface a sideband packet including an encoding parameter for the set of encoded data packets. The operations of 1410 may be performed according to the methods described herein. In some examples, aspects of the operations of 1410 may be performed by a sideband packet manager as described with reference to FIGS. 10 through 13.

At 1415, the device may modify an encoding or decoding process associated with the set of encoded data packets based on the sideband packet. The operations of 1415 may be performed according to the methods described herein. In some examples, aspects of the operations of 1415 may be performed by an ADSP as described with reference to FIGS. 10 through 13.

At 1420, the device may transport a second portion of the set of encoded data packets over the interface, where the second portion of the set of encoded data packets is encoded according to the modified encoding or decoding process. The operations of 1420 may be performed according to the methods described herein. In some examples, aspects of the operations of 1420 may be performed by an encoded packet manager as described with reference to FIGS. 10 through 13.

Figure 15:
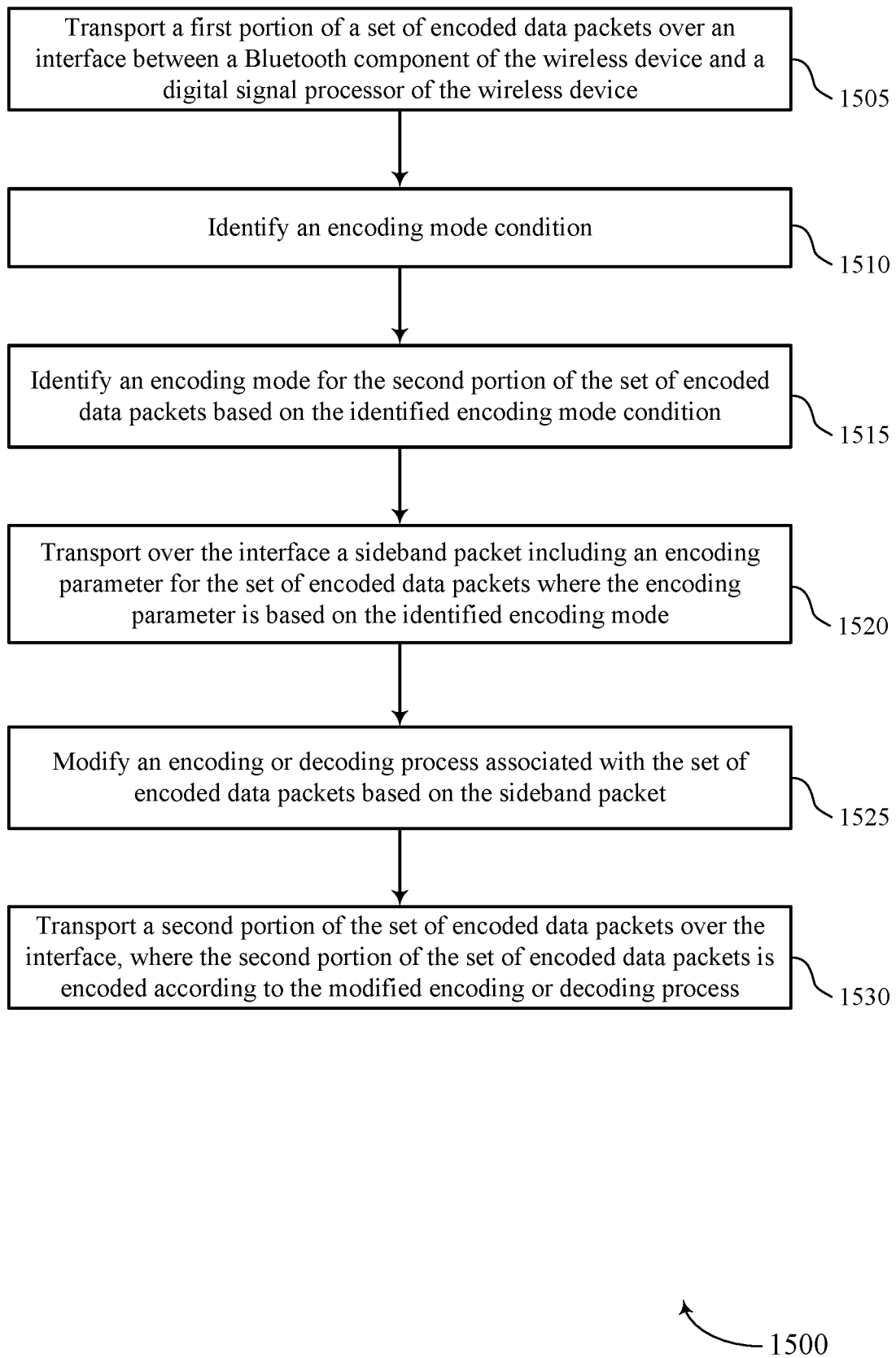

FIG. 15 shows a flowchart illustrating a method 1500 that supports power efficient metadata transport signaling mechanisms for codec control and configuration in accordance with aspects of the present disclosure. The operations of method 1500 may be implemented by a device or its components as described herein. For example, the operations of method 1500 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1505, the device may transport a first portion of a set of encoded data packets over an interface between a Bluetooth component of the wireless device and a digital signal processor of the wireless device. The operations of 1505 may be performed according to the methods described herein. In some examples, aspects of the operations of 1505 may be performed by an encoded packet manager as described with reference to FIGS. 10 through 13.

At 1510, the device may identify an encoding mode condition. The operations of 1510 may be performed according to the methods described herein. In some examples, aspects of the operations of 1510 may be performed by a sideband packet manager as described with reference to FIGS. 10 through 13.

At 1515, the device may identify an encoding mode for the second portion of the set of encoded data packets based on the identified encoding mode condition. The operations of 1515 may be performed according to the methods described herein. In some examples, aspects of the operations of 1515 may be performed by an encoding mode manager as described with reference to FIGS. 10 through 13.

At 1520, the device may transport over the interface a sideband packet including an encoding parameter for the set of encoded data packets, where the encoding parameter is based on the identified encoding mode. The operations of 1520 may be performed according to the methods described herein. In some examples, aspects of the operations of 1520 may be performed by an encoding mode manager as described with reference to FIGS. 10 through 13.

At 1525, the device may modify an encoding or decoding process associated with the set of encoded data packets based on the sideband packet. The operations of 1525 may be performed according to the methods described herein. In some examples, aspects of the operations of 1525 may be performed by an ADSP as described with reference to FIGS. 10 through 13.

At 1530, the device may transport a second portion of the set of encoded data packets over the interface, where the second portion of the set of encoded data packets is encoded according to the modified encoding or decoding process. The operations of 1530 may be performed according to the methods described herein. In some examples, aspects of the operations of 1530 may be performed by an encoded packet manager as described with reference to FIGS. 10 through 13.

Figure 16:
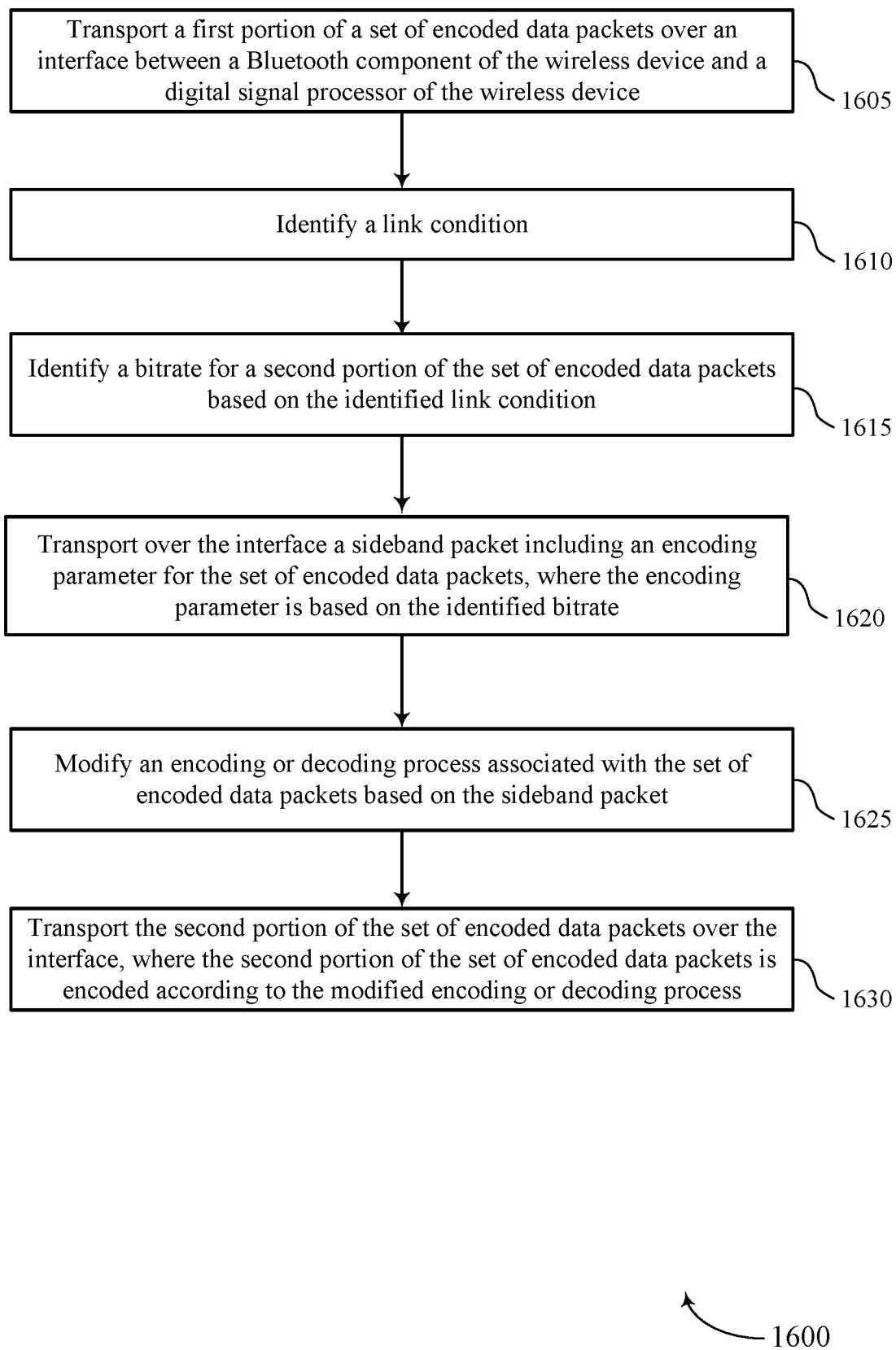

FIG. 16 shows a flowchart illustrating a method 1600 that supports power efficient metadata transport signaling mechanisms for codec control and configuration in accordance with aspects of the present disclosure. The operations of method 1600 may be implemented by a device or its components as described herein. For example, the operations of method 1600 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1605, the device may transport a first portion of a set of encoded data packets over an interface between a Bluetooth component of the wireless device and a digital signal processor of the wireless device. The operations of 1605 may be performed according to the methods described herein. In some examples, aspects of the operations of 1605 may be performed by an encoded packet manager as described with reference to FIGS. 10 through 13.

At 1610, the device may identify a link condition. The operations of 1610 may be performed according to the methods described herein. In some examples, aspects of the operations of 1610 may be performed by a sideband packet manager as described with reference to FIGS. 10 through 13.

At 1615, the device may identify a bitrate for a second portion of the set of encoded data packets based on the identified link condition. The operations of 1615 may be performed according to the methods described herein. In some examples, aspects of the operations of 1615 may be performed by a bitrate manager as described with reference to FIGS. 10 through 13.

At 1620, the device may transport over the interface a sideband packet including an encoding parameter for the set of encoded data packets, where the encoding parameter is based on the identified bitrate. The operations of 1620 may be performed according to the methods described herein. In some examples, aspects of the operations of 1620 may be performed by a bitrate manager as described with reference to FIGS. 10 through 13.

At 1625, the device may modify an encoding or decoding process associated with the set of encoded data packets based on the sideband packet. The operations of 1625 may be performed according to the methods described herein. In some examples, aspects of the operations of 1625 may be performed by an ADSP as described with reference to FIGS. 10 through 13.

At 1630, the device may transport the second portion of the set of encoded data packets over the interface, where the second portion of the set of encoded data packets is encoded according to the modified encoding or decoding process. The operations of 1630 may be performed according to the methods described herein. In some examples, aspects of the operations of 1630 may be performed by an encoded packet manager as described with reference to FIGS. 10 through 13.

It should be noted that the methods described herein describe possible implementations, and that the operations and the steps may be rearranged or otherwise modified and that other implementations are possible. Furthermore, aspects from two or more of the methods may be combined.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations. The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communications at a wireless device, comprising:
    transporting a first portion of a plurality of encoded data packets over an interface between a Bluetooth component of the wireless device and a digital signal processor of the wireless device;
    transporting over the interface a sideband packet comprising an encoding parameter for the plurality of encoded data packets, wherein the sideband packet is transported over the interface based at least in part on a compressed over pulse-code modulation format;
    modifying an encoding or decoding process associated with the plurality of encoded data packets based at least in part on the sideband packet; and
    transporting a second portion of the plurality of encoded data packets over the interface, wherein the second portion of the plurality of encoded data packets is encoded according to the modified encoding or decoding process.

2. The method of claim 1, further comprising:
    transporting a data payload over the interface, wherein the sideband packet further comprises metadata associated with the data payload.

3. The method of claim 1, further comprising:
    identifying an encoding mode condition; and
    identifying an encoding mode for the second portion of the plurality of encoded data packets based at least in part on the identified encoding mode condition, wherein the encoding parameter is based at least in part on the identified encoding mode.

4. The method of claim 1, further comprising:
    identifying a link condition; and
    identifying a bitrate for the second portion of the plurality of encoded data packets based at least in part on the identified link condition, wherein the encoding parameter is based at least in part on the identified bitrate.

5. The method of claim 1, further comprising:
    identifying a sideband identification field of the sideband packet, wherein a data payload of the sideband packet is based at least in part on the identified sideband identification field.

6. The method of claim 5, wherein the sideband identification field indicates a structure of a sideband payload field, a format of the sideband packet, or both.

7. The method of claim 5, wherein the data payload comprises a sequence number, a timestamp, content protection information, a number of frames, delivery time information, a drift, a frame size, a quality mask, reserved information bits, or some combination thereof.

8. The method of claim 1, further comprising:
controlling a delivery time for optimizing a round trip latency, a rate of data packet consumption, a rate of data packet production, a quality mask of encoded data packets, or some combination thereof, based at least in part on the sideband packet.

9. The method of claim 8, wherein the sideband packet comprises framework control information.

10. The method of claim 1, wherein the sideband packet comprises multiple sideband payload fields.

11. The method of claim 1, wherein the sideband packet is transported over the interface from the Bluetooth component of the wireless device to the digital signal processor of the wireless device.

12. The method of claim 1, wherein the sideband packet is transported over the interface from the digital signal processor of the wireless device to the Bluetooth component of the wireless device.

13. The method of claim 1, wherein modifying the decoding process comprises:
identifying, at a decoder module of the digital signal processor, a timestamp associated with a first encoded data packet of the first portion of the plurality of encoded data packets based at least in part on the encoding parameter, wherein the decoding process is modified based at least in part on the identified timestamp.

14. An apparatus for communications at a wireless device, comprising:
a processor,
memory in electronic communication with the processor; and
instructions stored in the memory and executable by the processor to cause the apparatus to:
transport a first portion of a plurality of encoded data packets over an interface between a Bluetooth component of the wireless device and a digital signal processor of the wireless device;
transport over the interface a sideband packet comprising an encoding parameter for the plurality of encoded data packets, wherein the sideband packet is transported over the interface based at least in part on a compressed over pulse-code modulation format;
modify an encoding or decoding process associated with the plurality of encoded data packets based at least in part on the sideband packet; and
transport a second portion of the plurality of encoded data packets over the interface, wherein the second portion of the plurality of encoded data packets is encoded according to the modified encoding or decoding process.

15. The apparatus of claim 14, wherein the instructions are further executable by the processor to cause the apparatus to:
transport a data payload over the interface, wherein the sideband packet further comprises metadata associated with the data payload.

16. The apparatus of claim 14, wherein the instructions are further executable by the processor to cause the apparatus to:
identify an encoding mode condition; and
identify an encoding mode for the second portion of the plurality of encoded data packets based at least in part on the identified encoding mode condition, wherein the encoding parameter is based at least in part on the identified encoding mode.

17. The apparatus of claim 14, wherein the instructions are further executable by the processor to cause the apparatus to:
identify a link condition; and
identify a bitrate for the second portion of the plurality of encoded data packets based at least in part on the identified link condition, wherein the encoding parameter is based at least in part on the identified bitrate.

18. The apparatus of claim 14, wherein the instructions are further executable by the processor to cause the apparatus to:
identify a sideband identification field of the sideband packet, wherein a data payload of the sideband packet is based at least in part on the identified sideband identification field.

19. An apparatus for communications at a wireless device, comprising:
means for transporting a first portion of a plurality of encoded data packets over an interface between a Bluetooth component of the wireless device and a digital signal processor of the wireless device;
means for transporting over the interface a sideband packet comprising an encoding parameter for the plurality of encoded data packets, wherein the sideband packet is transported over the interface based at least in part on a compressed over pulse-code modulation format;
means for modifying an encoding or decoding process associated with the plurality of encoded data packets based at least in part on the sideband packet; and
means for transporting a second portion of the plurality of encoded data packets over the interface, wherein the second portion of the plurality of encoded data packets is encoded according to the modified encoding or decoding process.

* * * * *